(12) United States Patent
Takenaka et al.

(10) Patent No.: US 7,843,713 B2
(45) Date of Patent: Nov. 30, 2010

(54) METHOD OF DRIVING DC/DC CONVERTER, AND DC/DC CONVERTER

(75) Inventors: Hidekazu Takenaka, Utsunomiya (JP); Toshihiro Sone, Takanezawa-machi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/338,399

(22) Filed: Dec. 18, 2008

(65) Prior Publication Data

US 2009/0160265 A1 Jun. 25, 2009

(30) Foreign Application Priority Data

Dec. 21, 2007 (JP) ............................ 2007-330920
Dec. 21, 2007 (JP) ............................ 2007-330921

(51) Int. Cl.
*H02M 3/24* (2006.01)
(52) U.S. Cl. ............................. 363/95; 363/97; 363/98
(58) Field of Classification Search .................. 323/222, 323/907; 363/132, 17, 98, 70, 15, 95, 97, 363/131
See application file for complete search history.

(56) References Cited

U.S. PATENT DOCUMENTS

| | | | | |
|---|---|---|---|---|
| 5,663,104 | A * | 9/1997 | Fukuyama | 438/123 |
| 6,043,634 | A * | 3/2000 | Nguyen et al. | 323/272 |
| 6,710,574 | B2 * | 3/2004 | Davis et al. | 318/800 |
| 6,876,043 | B1 * | 4/2005 | Sander | 257/378 |
| 2006/0091836 | A1 * | 5/2006 | Oyobe et al. | 318/149 |
| 2006/0139979 | A1 | 6/2006 | Song | |

FOREIGN PATENT DOCUMENTS

| | | |
|---|---|---|
| JP | 11-113253 | 4/1999 |
| JP | 2002-112534 | 4/2002 |
| JP | 2004-166447 | 6/2004 |
| JP | 2004-357388 | 12/2004 |
| JP | 2006-296112 | 10/2006 |
| JP | 2007-159315 | 6/2007 |
| JP | 2007-274796 | 10/2007 |

OTHER PUBLICATIONS

European Search Report for Application No. 08021827.4, dated Mar. 24, 2009.

(Continued)

*Primary Examiner*—Adolf Berhane
*Assistant Examiner*—Emily Pham
(74) *Attorney, Agent, or Firm*—Lahive & Cockfield, LLP; Anthony A. Laurentano

(57) ABSTRACT

When the three U-, V-, W-phase arms of a DC/DC converter are turned on, they are alternately turned on by gate drive signals. When the U-, V-, W-phase arms are alternately turned on, an upper arm switching device of the U-phase arm, for example, is turned on, and thereafter a lower arm switching device of the U-phase arm is turned on. Thereafter, an upper arm switching device of the V-phase arm which is next to the U-phase arm is turned on, and thereafter a lower arm switching device of the V-phase arm is turned on. The upper and lower arm switching devices are thus turned on in a rotation switching process.

9 Claims, 18 Drawing Sheets

OTHER PUBLICATIONS

Japanese Office Action for Application No. 2007-330920, dated Nov. 17, 2009.
Japanese Office Action for Application No. 2007-330920, dated Apr. 20, 2010.
Japanese Office Action for Application No. 2007-330921, dated Apr. 20, 2010.
Japanese Office Action for Application No. JP2007-330921, dated Sep. 28, 2010.

* cited by examiner

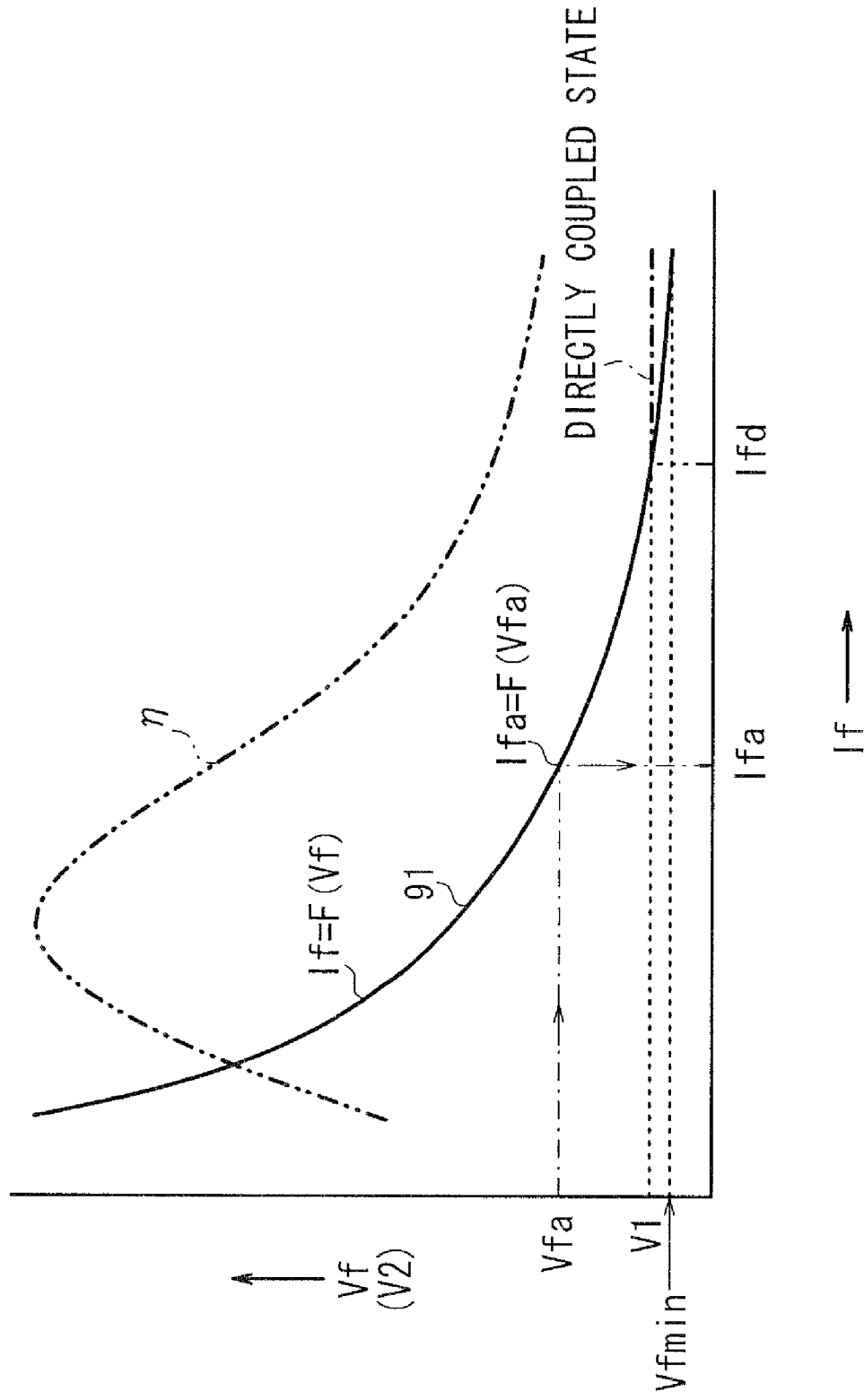

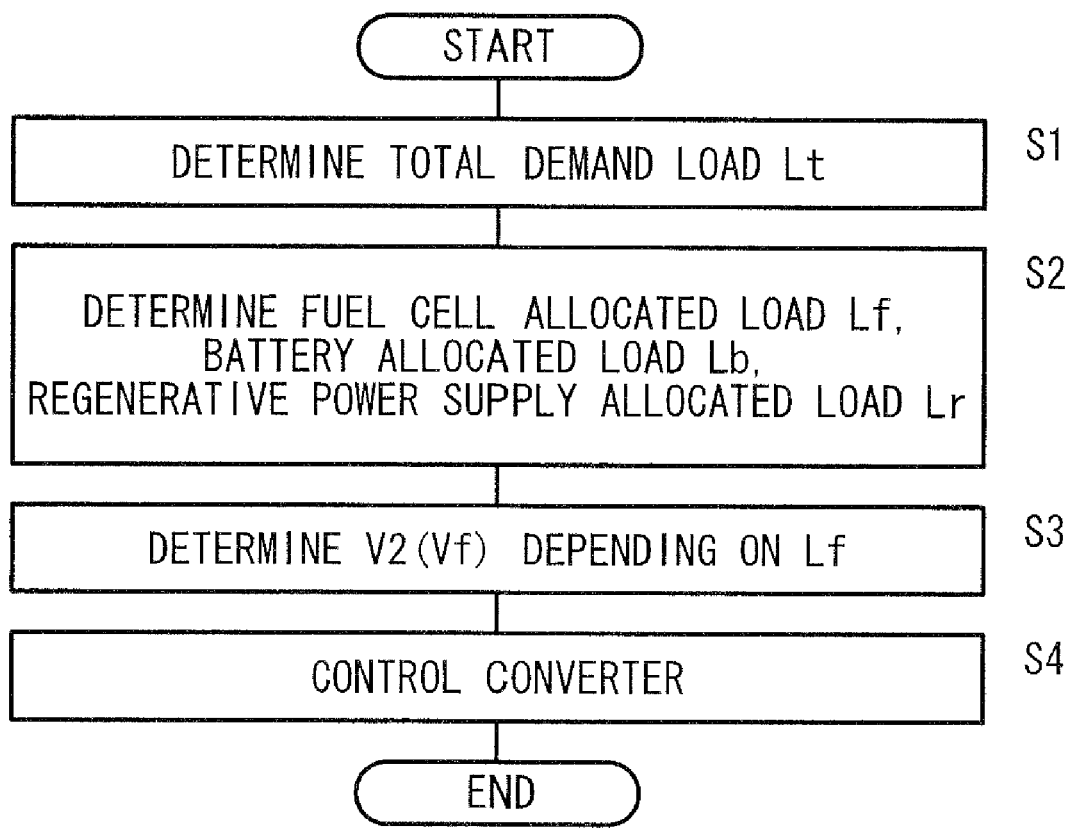

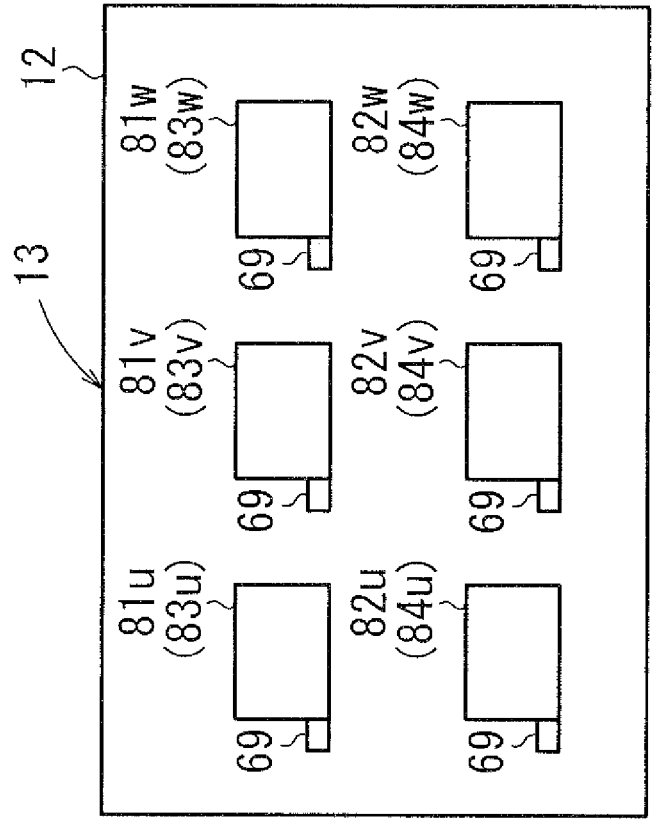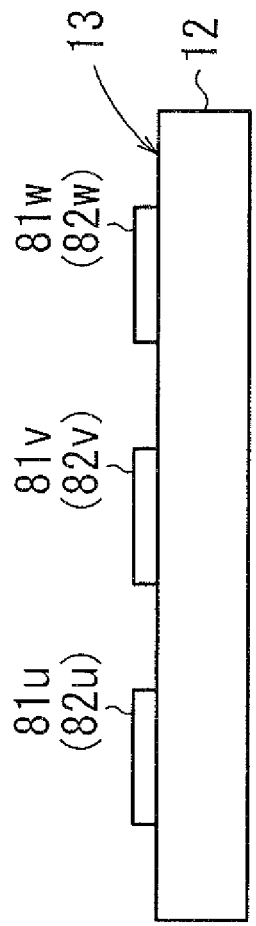
FIG. 4A
FIG. 4B

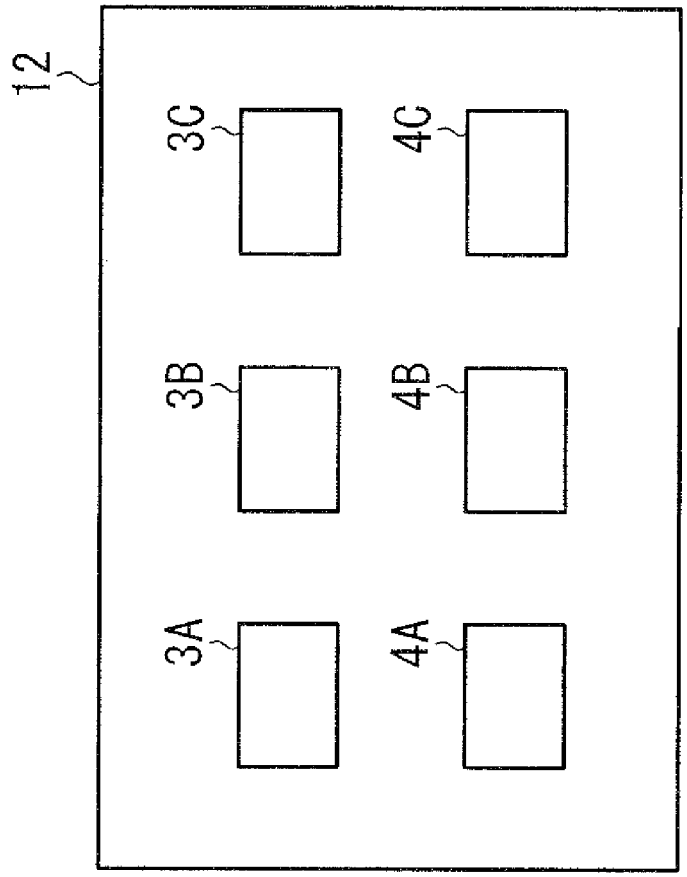
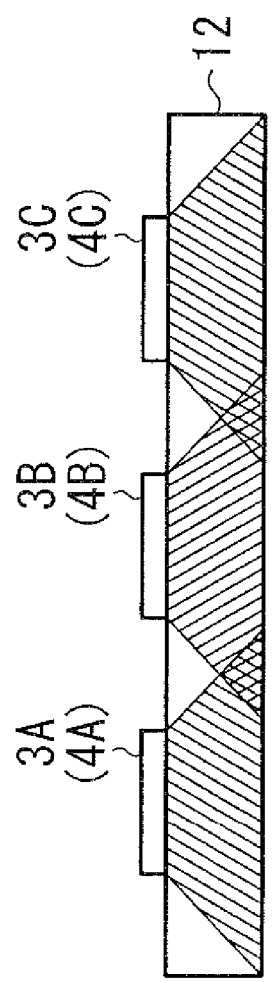
FIG. 18A
FIG. 18B

METHOD OF DRIVING DC/DC CONVERTER, AND DC/DC CONVERTER

BACKGROUND OF THE INVENTION

1. Field of the Invention

The present invention relates to a method of driving a chopper DC/DC converter, and a DC/DC converter.

2. Description of the Related Art

There have heretofore been widely used DC/DC converter apparatus as switching power supplies having switching devices such as MOSFETs, IGBTs, or the like.

For example, there has been proposed a vehicle (hereinafter referred to as "electric vehicle") incorporating a DC/DC converter apparatus for increasing and reducing a DC voltage, which is connected between an electricity storage device and a motor that is energized by an inverter. On the electric vehicle, when the motor is energized, the voltage across the electricity storage device is increased by the DC/DC converter apparatus and applied to the inverter, and when the motor regenerates electric power, the regenerated voltage from the inverter is lowered by the DC/DC converter apparatus and applied to charge the electricity storage device.

There has also been proposed a vehicle (hereinafter also referred to as "fuel cell vehicle") which also uses a motor as a propulsive source. The fuel cell vehicle includes a fuel cell directly connected to the motor which is energized by an inverter. A DC/DC converter apparatus for increasing and reducing a DC voltage is connected between an electricity storage device and the junction between the fuel cell and the motor. The fuel cell is used as a main power supply, and the electricity storage device as an auxiliary power supply for assisting the main power supply.

On the fuel cell vehicle, when the motor is energized, the voltage across the fuel cell and the voltage across the electricity storage device, which has been increased by the DC/DC converter apparatus, are added together, and the sum voltage is applied to the inverter. When the motor regenerates electric power, the regenerated voltage from the inverter is lowered by the DC/DC converter apparatus and applied to charge the electricity storage device. If the electric power generated by the fuel cell contains an excessive amount of electric power, then it is lowered in voltage and applied to charge the electricity storage device.

FIG. 16 of the accompanying drawings shows a DC/DC converter apparatus 16 disclosed in Japanese Laid-Open Patent Publication No. 2004-357388 that is applied to an electric vehicle. As shown in FIG. 16, the DC/DC converter apparatus 16 basically comprises a DC/DC converter 6 including reactors 2A, 2B, 2C and a switching device comprising three-phase arms made up of upper and lower arm switching devices including transistors 3A, 3B, 3C, 4A, 4B, 4C that are connected inversely across respective diodes 7A, 7B, 7C, 8A, 8B, 8C, and a control means 5 for controlling the DC/DC converter 6.

The DC/DC converter apparatus 16 has a function to convert the voltage of a DC power supply 1 at a low-voltage terminal TL into a voltage that is m times higher and apply the converted voltage to a load 11 through a high-voltage terminal TH (voltage increasing mode), and also a function to convert the voltage at the high-voltage terminal TH into a voltage that is 1/m times lower and apply the converted voltage to the DC power supply 1 through the low-voltage terminal TL (voltage reducing mode).

As shown in FIG. 17 of the accompanying drawings, while the DC/DC converter apparatus 16 is in the voltage increasing mode, when it is driven at a duty ratio of 92 $\{\approx(11/12)\times100\}$ [%] in a switching period $2\pi$, the transistors 4A, 4B, 4C of the lower arm switching devices of the three-phase arms are turned on at timings that are $2\pi/3$ out of phase by gate drive signals ULA, ULB, ULC from the control means 5.

While the transistors 4A, 4B, 4C are being energized, since the terminals of the reactors 2A, 2B, 2C which are connected to the respective transistors 4A, 4B, 4C are grounded, the current from the DC power supply 1 flows through the reactors 2A, 2B, 2C to ground. At this time, the reactors 2A, 2B, 2C store an amount of energy which is proportional to the product of the square of the current flowing therethrough and the inductance of the reactors 2A, 2B, 2C.

When the transistors 4A, 4B, 4C are then turned off, a current depending on the energy stored in the reactors 2A, 2B, 2C flows through the diodes 7A, 7B, 7C to the high-voltage terminal TH. The voltage at the high-voltage terminal TH is monitored by a voltage detecting circuit 6a.

While the DC/DC converter apparatus 16 is in the voltage reducing mode, the transistors 3A, 3B, 3C of the upper arm switching devices are turned on at timings that are $2\pi/3$ out of phase by gate drive signals UHA, UHB, UHC from the control means 5. When the transistors 3A, 3B, 3C are energized, a current flows from the high-voltage terminal TH through the transistors 3A, 3B, 3C and the reactors 2A, 2B, 2C to the DC power supply 1 through the low-voltage terminal TL, storing energy in the reactors 2A, 2B, 2C.

When the transistors 3A, 3B, 3C are then successively turned off, the diodes 8A, 8B, 8C are successively turned on correspondingly, causing a current to flow from ground through the diodes 8A, 8B, 8C and the reactors 2A, 2B, 2C to the DC power supply 1. The DC/DC converter apparatus 16 thus operates as a voltage reducing circuit.

If voltage increasing/reducing DC/DC converter apparatus need to produce an output current higher than the rated current of switching devices such as MOSFETs or IGBTs, then the DC/DC converter apparatus are required to have multiphase arms, rather than a single phase arm, as is the case with the DC/DC converter apparatus 16. Since the output current is distributed to the phase arms, the DC/DC converter apparatus require multiphase reactors, e.g., the three reactors 2A, 2B, 2C for the three phases in the DC/DC converter apparatus 16 shown in FIG. 16.

A reactor has impedance that is greater in proportion to the frequency of a current flowing therethrough. If the output current is constant, then the reactor needs to have a greater inductance as the frequency is lower. Though a reactor with a smaller Q is preferable for a lower resistance loss, a thicker conductive wire is necessary to make a reactor with a smaller Q.

It is desirable that DC/DC converter apparatus be as small and light as possible. However, the need for as many reactors as the number of multiphase arms presents one of obstacles to efforts to reduce the size and weight of the DC/DC converter apparatus.

The DC/DC converter apparatus 16 shown in FIG. 16 employs high-power transistors as switching devices. With the three-phase arms, as shown in plan in FIG. 18A of the accompanying drawings, the six transistors 3A, 3B, 3C, 4A, 4B, 4C are fixedly mounted on a metal heat radiating plate (heat spreader) 12.

As shown in FIG. 17, during the switching period $2\pi$, three transistors are simultaneously energized during a time which is 9/12 of the switching period $2\pi$, and two transistors are simultaneously energized during a remaining time which is 3/12 of the switching period $2\pi$.

FIG. 18B of the accompanying drawings shows a pattern, shown hatched, in which the heat from the transistors is transferred through the heat spreader 12. As shown in FIG. 18B, while the three transistors are simultaneously energized, the heat transferred therefrom concentrates in regions, shown cross-hatched, of the heat spreader 12, resulting in a poor heat radiation efficiency. In order to meet thermal conditions such as maximum allowable temperatures for the transistors, it is necessary to increase the volume and surface area of the heat spreader 12, and to increase the rate of a coolant supplied to cool the heat spreader 12. As a result, the DC/DC converter apparatus 16 tends to be large in size.

SUMMARY OF THE INVENTION

It is an object of the present invention to provide a method of driving a DC/DC converter having an excellent heat radiating capability and enabling reduction in size and weight, and a DC/DC converter which is small in size and light in weight.

A method of driving a DC/DC converter according to the present invention comprises the steps of: connecting a plurality of phase arms parallel to each other between a first electric power device and a second electric power device, each of the phase arms comprising a series-connected circuit of an upper arm switching device and a lower arm switching device and diodes connected inversely across the upper arm switching device and lower arm switching device; alternately turning on the phase arms; and when one of the phase arms is turned on, turning on either the upper arm switching devices or the lower arm switching device, or alternately turning on the upper arm switching device and the lower arm switching device.

With the method of driving a DC/DC converter, the upper arm switching devices and the lower arm switching devices are not simultaneously turned on, and the different phase arms are not simultaneously turned on. Rather, at most one switching device is turned on at all times. Therefore, the DC/DC converter is of an excellent heat radiating capability, i.e., can easily be designed for heat radiation. As a result, the DC/DC converter apparatus can be reduced in size and weight.

With the above method, the upper arm switching devices and the lower arm switching devices are not simultaneously turned on, and the different phase arms are not simultaneously turned on. Rather, at most one switching device is turned on at all times. Therefore, the DC/DC converter is of an excellent heat radiating capability, i.e., can easily be designed for heat radiation. As a result, the DC/DC converter apparatus can be reduced in size and weight.

A DC/DC converter according to the present invention comprises a plurality of phase arms connected parallel to each other between a first electric power device and a second electric power device and comprising a series-connected circuit of upper arm switching devices and lower arm switching devices and diodes connected inversely across the upper arm switching devices and lower arm switching devices, the phase arms having respective midpoints connected to each other, and a reactor inserted between the connected midpoints and the first electric power device or the second electric power device.

The DC/DC converter for increasing or reducing the voltage with the multiphase arms includes the single reactor, and hence is reduced in size and weight. Inasmuch as the DC/DC converter needs only one reactor, the DC/DC converter may be smaller in size and weight than the DC/DC converter having the multiphase arms according to the related art, as the number of the phases of the multiphase arms increases.

With the DC/DC converter having the multiphase arms (three-phase arms for an easier understanding of the invention) according to the related art, each of the reactors of the three-phase arms is energized once in one switching period. According to the present invention, the single reactor is energized once in one switching period $2\pi$ by the three-phase upper arm switching devices or the three-phase lower arm switching devices during a voltage increasing mode or a voltage reducing mode. The present invention also covers a process wherein the single reactor is energized once alternately by the three-phase upper arm switching devices and the three-phase lower arm switching devices in one switching period $2\pi$.

According to the present invention, since the operating frequency of the single reactor is three times higher, the inductance value thereof may be one-third of the inductance values of the reactors according to the related art. Accordingly, the reactor may be reduced in size.

Although the DC/DC converter may become slightly difficult to design for heat radiation, under the condition that the switching devices are used in a range of their rated currents (allowable device temperatures), the upper arm switching devices of a plurality of phases may be simultaneously turned on and then, after a dead time, the lower arm switching devices of a plurality of phases may be simultaneously turned on. Such a process is also covered by the present invention. Also, a plurality of lower arm switching devices may be simultaneously turned on and then, after a dead time, a plurality of upper arm switching devices may be simultaneously turned on. Furthermore, a plurality of upper arm switching devices may be simultaneously turned on and then, after a dead time, a plurality of upper arm switching devices may be simultaneously turned on. Alternatively, a plurality of lower arm switching devices may be simultaneously turned on and then, after a dead time, a plurality of lower arm switching devices may be simultaneously turned on. These processes are also covered by the present invention. Since the single reactor is shared by the phases in these processes, the DC/DC converter is small in size and weight.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a diagram showing the current vs. voltage characteristics of a fuel cell;

FIG. 3 is a flowchart of a basic control sequence of a DC/DC converter apparatus installed in the fuel cell vehicle;

FIG. 4A is a plan view showing the layout of upper and lower arm switching devices on a heat radiating plate;

FIG. 4B is a side elevational view of the upper and lower arm switching devices on the heat radiating plate;

FIG. 18A is a plan view showing the layout of switching devices mounted on a heat radiating plate; and FIG. 18B is a side elevational view showing a pattern in which the heat from the switching devices shown in FIG. 18A is transferred through the heat radiating plate when the switching devices are simultaneously turned on.

DESCRIPTION OF THE PREFERRED EMBODIMENTS

Vehicles incorporating a method of driving a DC/DC converter and a DC/DC converter according to the present invention will be described below with reference to the drawings.

Figure 1:
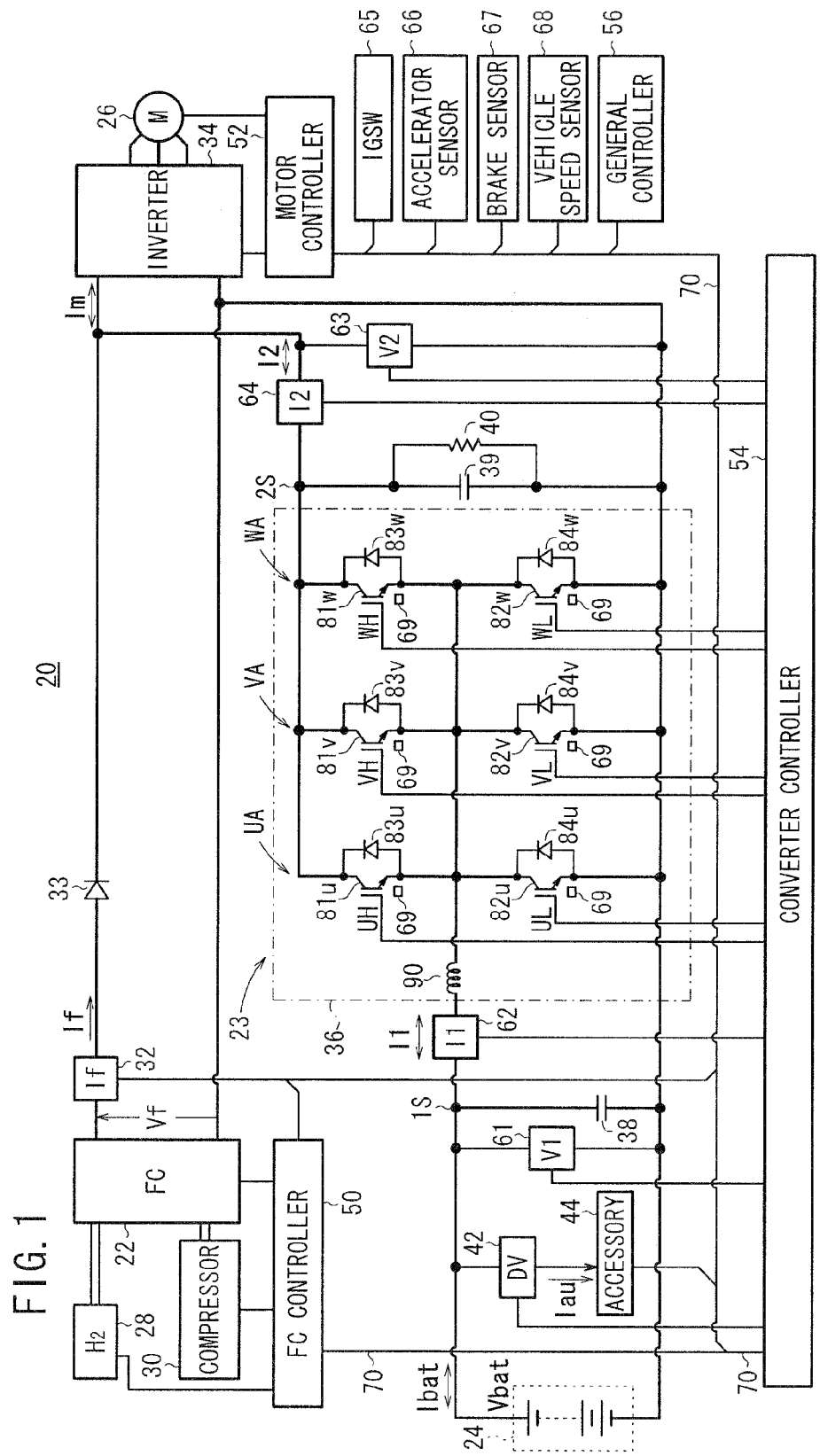
FIG. 1 is a circuit diagram, partly in block form, of a fuel cell vehicle according to an embodiment of the present invention.

FIG. 1 shows a fuel cell vehicle 20 according to an embodiment of the present invention. As shown in FIG. 1, the fuel cell vehicle 20 basically comprises a hybrid power supply system including a fuel cell (FC) 22 and an electricity storage device (referred to as "battery") 24 which is an energy storage, a travel motor 26 for being supplied with a current (electric power) from the hybrid power supply system through an inverter 34, and a DC/DC converter apparatus {also referred to as "VCU (Voltage Control Unit)"} 23 for converting voltages between a primary end 1S connected to the battery 24 and a secondary end 2S connected to the fuel cell 22 and the motor 26 (the inverter 34).

The VCU 23 comprises a DC/DC converter 36 and a converter controller 54 for controlling the DC/DC converter 36.

The fuel cell 22 is of a stacked structure made up of cells each comprising an anode, a cathode, and a solid polymer electrolytic membrane sandwiched between the anode and the cathode. The fuel cell 22 is connected to a hydrogen tank 28 and an air compressor 30 by pipes. The fuel cell 22 generates a current If due to electrochemical reaction between hydrogen (fuel gas) and air (oxidizing gas) as reactant gas. The generated current If is supplied through a current sensor 32 and a diode (also referred to as "disconnecting diode") 33 to the inverter 34 and/or the DC/DC converter 36.

The inverter 34 conducts conversion from direct current into alternating current, and supplies a motor current Im to the motor 26. The inverter 34 also conducts conversion from alternating current into direct current in a regenerative mode, and supplies the motor current Im from the secondary end 2S to the primary end 1S through the DC/DC converter 36.

A secondary voltage V2, which may be the regenerated voltage or the generated voltage Vf across the fuel cell 22, is converted into a low primary voltage V1 by the DC/DC converter 36. The low primary voltage V1 is further converted into a lower voltage by a downverter 42. The downverter 42 supplies, under the lower voltage, an accessory current Iau to accessories 44 such as lamps, etc. and also supplies any excess current as a battery current Ibat to charge the battery 24.

The battery 24, which is connected to the primary end 1S, may comprise a lithium ion secondary battery or a capacitor. In the present embodiment, the battery 24 comprises a lithium ion secondary battery.

The battery 24 supplies the accessory current Iau to the accessories 44 through the downverter 42, and also supplies the motor current Im through the DC/DC converter 36 to the inverter 34.

Smoothing capacitors 38, 39 are connected respectively to the primary and secondary ends 1S, 2S. A resistor 40 is connected across the smoothing capacitor 39, i.e., across the fuel cell 22.

The fuel cell 22, the hydrogen tank 28, and the air compressor 30 make up a system controlled by an FC controller 50. The inverter 34 and the motor 26 make up a system controlled by a motor controller 52 which includes an inverter driver. The DC/DC converter 36 makes up a system controlled by the converter controller 54 which includes a converter driver.

The FC controller 50, the motor controller 52, and the converter controller 54 are controlled by a general controller 56 which serves as a higher-level controller for determining a total load Lt on the fuel cell 22, etc.

Each of the general controller 56, the FC controller 50, the motor controller 52, and the converter controller 54 comprises a CPU, a ROM, a RAM, a timer, input and output interfaces including an A/D converter, a D/A converter, and, if necessary, a DSP (Digital Signal Processor), etc.

The general controller 56, the FC controller 50, the motor controller 52, and the converter controller 54 are connected to each other by communication lines 70 such as of a CAN (Controller Area Network) as an intravehicular LAN, and perform various functions by sharing input and output information from various switches and various sensors and executing programs stored in the ROMs under the CPUs based on the input and output information from the various switches and various sensors.

The switches and the sensors for detecting vehicle states include, in addition to the current sensor 32 for detecting the generated current If, a voltage sensor 61 for detecting a primary voltage V1 which is equal to a battery voltage Vbat, a current sensor 62 for detecting a primary current I1, a voltage sensor 63 for detecting a secondary voltage V2 which is substantially equal to the generated voltage Vf across the fuel cell 22 when the disconnecting diode 33 is rendered conductive, a current sensor 64 for detecting a secondary current I2, an ignition switch (IGSW) 65, an accelerator sensor 66, a brake sensor 67, a vehicle speed sensor 68 which are connected to the communication lines 70, and temperature sensors 69 connected to the converter controller 54.

The general controller 56 determines a total demand load Lt on the fuel cell vehicle 20 based on the state of the fuel cell 22, the state of the battery 24, the state of the motor 26, the state of the accessories 44, and the input signals from the switches and the sensors (load demands), determines the shares of a fuel cell allocated load (demand output) Lf to be allocated to the fuel cell 22, a battery allocated load (demand output) Lb to be allocated to the battery 24, and a regenerative power supply allocated load Lr to be allocated to the regenerative power supply, through an arbitration process, based on the total demand load Lt, and sends commands indicative of the determined shares to the FC controller 50, the motor controller 52, and the converter controller 54.

The DC/DC converter 36 comprises three phase arms connected parallel to each other between a first power device in the form of the battery 24 and a second power device in the form of the fuel cell 22 or the regenerative power supply (the inverter 34 and the motor 26). The three phase arms include a U-phase arm UA ($81u$, $82u$), a V-phase arm VA ($81v$, $82v$), and a W-phase arm WA ($81w$, $82w$) which are made up of upper arm switching devices 81 ($81u$, $81v$, $81w$) and lower arm switching devices 82 ($82u$, $82v$, $82w$) such as IGBTs or the like.

Diodes $83u$, $83v$, $83w$, $84u$, $84v$, $84w$ are connected inversely across the respective arm switching devices $81u$, $81v$, $81w$, $82u$, $82v$, $82w$.

A single reactor 90 for discharging and storing energy at the time the DC/DC converter 36 converts voltage between the primary voltage V1 and the secondary voltage V2 is inserted between the battery 24 and the commonly connected midpoints of the U-phase arm UA, the V-phase arm VA, and the W-phase arm WA.

The upper arm switching devices 81 ($81u$, $81v$, $81w$) are turned on by gate drive signals (drive voltages) UH, VH, WH output from the converter controller 54 when the gate drive signals UH, VH, WH are high in level. The lower arm switching devices 82 ($82u$, $82v$, $82w$) are turned on by gate drive signals (drive voltages) UL, VL, WL output from the converter controller 54 when the gate drive signals UL, VL, WL are high in level.

The primary voltage V1, typically the open circuit voltage OCV across the battery 24 at the time no load is connected to the battery 24, is set to a voltage higher than a minimum voltage Vfmin of the generated voltage Vf of the fuel cell 22 as indicated by a fuel cell output characteristic curve (current-voltage characteristics) 91 shown in FIG. 2. In FIG. 2, OCV≈V1.

The secondary voltage V2 is equal to the generated voltage Vf of the fuel cell 22 while the fuel cell 22 is generating electric power.

When the generated voltage Vf of the fuel cell 22 becomes equal to the voltage Vbat (=V1) of the battery 24, the fuel cell 22 and the battery 24 are in a directly coupled state as indicated by the thick dot-and-dash line in FIG. 2. In the directly coupled state, the duty ratios of the gate drive signals UH, VH, WH supplied to the upper arm switching devices 81 ($81u$, $81v$, $81w$) are, for example, 100 [%], and the duty ratios of the gate drive signals UL, VL, WL supplied to the lower arm switching devices 82 ($82u$, $82v$, $82w$) are, for example, 0 [%]. In the directly coupled state, when a current is to flow from the secondary end 2S to the primary end 1S in a charging direction (regenerating direction), the current flows through the upper arm switching devices 81 ($81u$, $81v$, $81w$). When a current is to flow from the primary end 1S to the secondary end 2S in a propulsive direction, the current flows through the diodes $83u$, $83v$, $83w$.

In a directly coupled state (referred to as "directly coupled state for high output power" or "first directly coupled state") for supplying or sourcing the secondary current I2 from the secondary end 2S of the DC/DC converter 36 to the inverter 34 for producing high output power, the secondary voltage V2 is represented by V2=V1−Vd (Vd is a forward voltage drop across the diodes $83u$, $83v$, $83w$).

The directly coupled state is not limited to the time when high output power is to be produced, but may be employed if necessary for control. For example, the directly coupled state may be utilized when the fuel cell vehicle 20 is stopped. When the fuel cell vehicle 20 is stopped at a traffic signal or the like, the air compressor 30 is inactivated and the hydrogen tank 28 does not supply the fuel gas for better fuel economy. At this time, when the remaining fuel gas in the fuel cell 22 is used up, the generated voltage Vf (generated current If) of the fuel cell 22 falls to zero as it is discharged by the resistor 40 and supplied to the accessories 44 including an air conditioner. However, the accessory current Iau is continuously supplied from the battery 24 to the accessories 44.

When the fuel cell 22 is to generate electric power by releasing the brake pedal and pressing the accelerator pedal while the fuel cell vehicle 20 is being stopped in an idling state, the voltage at the secondary end 2S of the DC/DC converter 36 is kept at a level in a directly coupled state in order for the VCU 23 to resume its output control on the fuel cell 22 smoothly. In this directly coupled state (referred to as "idling directly coupled state" or "second directly coupled state"), the resistor 40 serves as the load, and the secondary voltage V2 at the secondary end 2S of the DC/DC converter 36 is held at the level V2=V1−Vd.

The output control performed on the fuel cell 22 by the VCU 23 will be described below.

When the fuel cell 22 generates electric power while it is being supplied with the fuel gas from the hydrogen tank 28 and the compressed air from the air compressor 30, the generated current If of the fuel cell 22 is determined by the converter controller 54 setting the secondary voltage V2, i.e., the generated voltage Vf, through the DC/DC converter 36 on the characteristic curve 91, also referred to as "function F(Vf)", shown in FIG. 2. The generated current If is determined as a function F(Vf) value of the generated voltage Vf. Since If=F(Vf), if the generated voltage Vf is set as Vf=Vfa=V2, a generated current Ifa is determined as a function value of the generated voltage Vfa(V2) according to Ifa=F(Vfa)=F(V2).

Inasmuch as the generated current If of the fuel cell 22 is determined when the secondary voltage V2 (the generated voltage Vf) is determined, the secondary voltage V2 (the generated voltage Vf) is set as a target voltage (target value) when the fuel cell vehicle 20 is controlled for its propulsion. In special cases when the battery 24 (the first power device) is regarded as suffering a failure such as when the battery 24 is opened due to a wire disconnection between the downverter 42 and the battery 24, the primary voltage V1 is used as the target voltage.

In a system including the fuel cell 22, such as the fuel cell vehicle 20, the VCU 23 is controlled to set the secondary voltage V2 at the secondary end 2S of the DC/DC converter 36 as the target voltage, and the output (the generated current If) of the fuel cell 22 is controlled by the VCU 23. The output control performed on the fuel cell 22 by the VCU 23 has been described above.

A basic operation of the DC/DC converter 36 that is controlled by the converter controller 54 will be described below with reference to the flowchart of FIG. 3.

As described above, the general controller 56 determines a total demand load Lt on the fuel cell vehicle 20 based on the state of the fuel cell 22, the state of the battery 24, the state of the motor 26, the state of the accessories 44, and the input signals from the switches and the sensors (load demands), determines the shares of a fuel cell allocated load (demand output) Lf to be allocated to the fuel cell 22, a battery allocated load (demand output) to be allocated to the battery 24, and a regenerative power supply allocated load Lr to be allocated to the regenerative power supply, through an arbitration process, based on the total demand load Lt, and sends commands indicative of the determined shares to the FC controller 50, the motor controller 52, and the converter controller 54.

In step S1 shown in FIG. 3, the general controller 56 determines (calculates) a total demand load Lt from the power demand of the motor 26, the power demand of the accessories 44, and the power demand of the air compressor 30, which all represent load demands. In step S2, the general controller 56 determines the shares of a fuel cell allocated load Lf, a battery allocated load Lb, and a regenerative power supply allocated load Lr for outputting the determined total demand load Lt. When the general controller 56 determines the fuel cell allocated load Lf, the general controller 56 takes the efficiency η of the fuel cell 22 into account.

Then, in step S3, the converter controller 54 determines a generated voltage Vf of the fuel cell 22, i.e., the secondary voltage V2 in this embodiment, depending on the fuel cell allocated load Lf.

After the secondary voltage V2 is determined, the converter controller 54 controls the DC/DC converter 36 to achieve the determined secondary voltage V2 in step S4.

Specifically, the converter controller 54 energizes the DC/DC converter 36 in a voltage increasing mode, a voltage reducing mode, or a directly coupled mode, depending on the determined secondary voltage V2.

In the voltage increasing mode for sourcing the secondary current I2 from the secondary end 2S of the DC/DC converter 36 to the inverter 34 in step S4, the converter controller 54 controls the DC/DC converter 36 in a rotation switching process by turning on the lower arm switching device 82u (storing energy in the reactor 90 with the primary current I1 produced by subtracting the accessory current Iau from the battery current Ibat and at the same time sourcing the secondary current I2 from the capacitor 39 to the inverter 34). Then, the converter controller 54 controls the DC/DC converter 36 by rendering the diodes 83u, 83v, 83w conductive (discharging the energy from the reactor 90, storing the energy in the capacitor 39, and sourcing the secondary current I2 to the inverter 34). Thereafter, the converter controller 54 controls the DC/DC converter 36 by turning on the lower arm switching device 82v in the same manner as above, then rendering the diodes 83u, 83v, 83w conductive in the same manner as above, then turning on the lower arm switching device 82w in the same manner as above, then rendering the diodes 83u, 83v, 83w conductive in the same manner as above, thereafter turning on the lower arm switching device 82u, and so on.

The upper arm switching devices 81u, 81v, 81w and the lower arm switching devices 82u, 82v, 82w have their ON duty ratios determined to keep the output voltage V2 at the command voltage from the general controller 56.

In the directly coupled mode for high output power wherein the secondary current I2 is sourced from the secondary end 2S of the DC/DC converter 36 to the inverter 34 in step S4, the diodes 83u, 83v, 83w are rendered conductive, and the secondary voltage V2 is represented by V2=V1−Vd.

In the voltage reducing mode for supplying or sinking the secondary current I2 from the secondary end 2S of the DC/DC converter 36 to the accessories 44 and the battery 24 at the primary end 1S in step S4, the converter controller 54 controls the DC/DC converter 36 in a rotation switching process by turning on the upper arm switching device 81u so as to store energy in the reactor 90 with the secondary current I2 output from the capacitor 39 and at the same time supply the primary current I1 from the capacitor 38 to the accessories 44 and, if necessary, the battery 24. Then, the converter controller 54 controls the DC/DC converter 36 by rendering the diodes 84u, 84v, 84w conductive. In this case, the diodes 84u, 84v, 84w are rendered conductive as flywheel diodes discharging the energy from the reactor 90, storing the energy in the capacitor 39, and supplying the primary current I1 to the accessories 44 and, if necessary, the battery 24. Thereafter, the converter controller 54 controls the DC/DC converter 36 by turning on the upper arm switching device 81v in the same manner as above, then rendering the diodes 84u, 84v, 84w conductive in the same manner as above, then turning on the upper arm switching device 81w in the same manner as above, then rendering the diodes 84u, 84v, 84w conductive in the same manner as above, thereafter turning on the upper arm switching device 81u, and so on.

If a regenerated voltage exists, then the regenerative power supply allocated load Lr is added to the secondary current that is sunk in the voltage reducing mode. In the voltage reducing mode, the upper arm switching devices 81u, 81v, 81w and the lower arm switching devices 82u, 82v, 82w also have their ON duty ratios controlled depending on the determined output voltage V2.

The secondary voltage V2 and the primary voltage V1 are controlled by the converter controller 54 while it is controlling the DC/DC converter 36 in the PID operation based on a combination of a feed-forward control process and a feedback control process.

The basic operation of the DC/DC converter 36 controlled by the converter controller 54 has been described above.

As shown in FIGS. 4A and 4B, the arm switching devices 81u, 81v, 81w, 82u, 82v, 82w are assembled as a so-called 6-in-1 module 13 fixedly mounted on a metal heat radiating plate (heat spreader) 12. The arm switching devices 81u, 81v, 81w, 82u, 82v, 82w are associated with the respective temperature sensors 69. The temperature sensors 69 and the gate terminals of the arm switching devices 81u, 81v, 81w, 82u, 82v, 82w are connected to the converter controller 54. The diodes 83u, 83v, 83w, 84u, 84v, 84w that are paired with arm switching devices 81u, 81v, 81w, 82u, 82v, 82w are omitted from illustration in FIGS. 4A and 4B.

The inverter 34 for driving the motor 26 is also in the form of a 6-in-1 module as is the case with the DC/DC converter 36. Therefore, the fuel cell vehicle 20 is of a reduced cost.

For driving the motor 26 with the inverter 34, however, the midpoints of the three phase arms of the inverter 34 are not connected in common, but connected to the U-, V-, and W-phase coils of the motor 26 in a full bridge configuration.

The fuel cell vehicle 20 according to the present embodiment is basically constructed and operates as described above. The rotating switching process controlled by the VCU 23 including the DC/DC converter 36 will be described in detail below.

Figure 5:
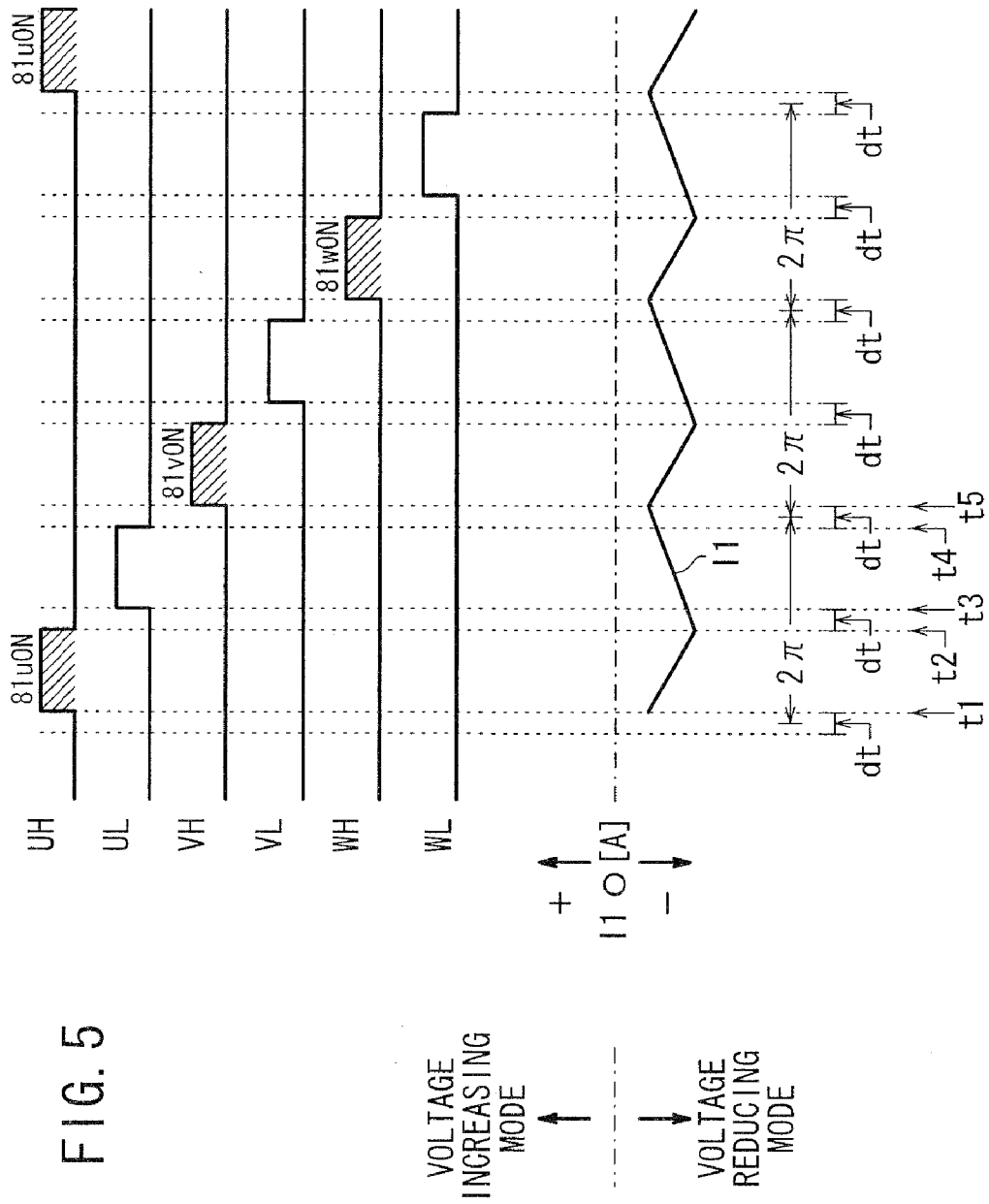
FIG. 5 is a timing chart of a voltage reducing mode of the DC/DC converter apparatus.
Figure 6:
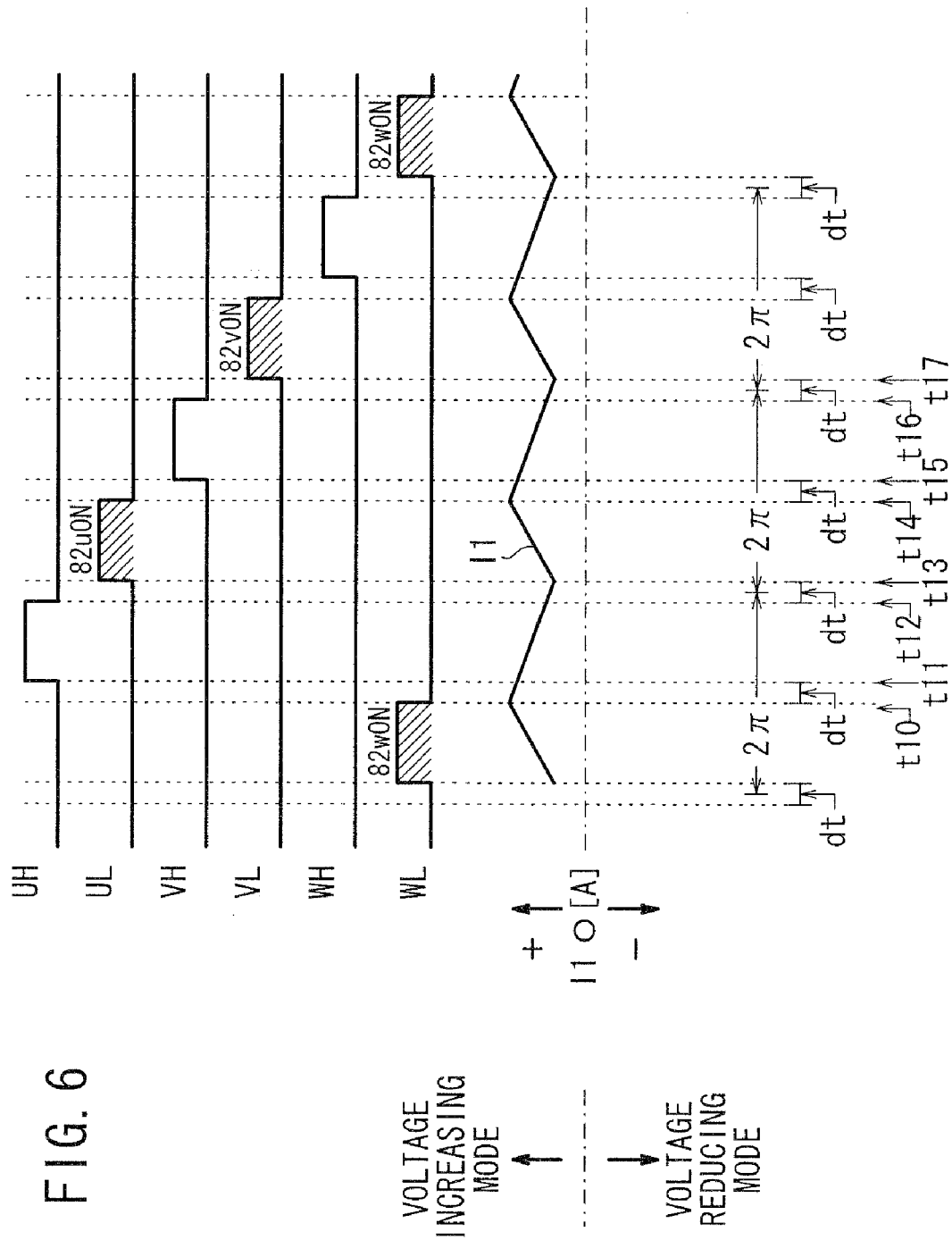
FIG. 6 is a timing chart of a voltage increasing mode of the DC/DC converter apparatus.

FIG. 5 is a timing chart of a voltage reducing mode (for sinking the secondary current I2) of the VCU 23, and FIG. 6 is a timing chart of a voltage increasing mode (for sourcing the secondary current I2) of the VCU 23.

In FIGS. 5 and 6, the primary current I1 flowing through the reactor 90 has a positive (+) sign when it flows from the primary end 1S to the secondary end 2S in the voltage increasing mode (a source current flowing from the secondary end 2S of the DC/DC converter 36 to the inverter 34), and a negative sign (−) when it flows from the secondary end 2S to the primary end 1S in the voltage reducing mode (a sink current flowing from the fuel cell 22 or the inverter 34 to the secondary end 2S of the DC/DC converter 36).

Of the waveforms of the gate drive signals UH, UL, VH, VL, WH, WL output from the converter controller 54, periods that are shown hatched represent periods in which the arm switching devices which are supplied with the gate drive signals UH, UL, VH, VL, WH, WL (e.g., the upper arm switching device 81*u* is supplied with the gate drive signal UH) are actually turned on, i.e., currents are flowing through the arm switching devices. It is to be noted that even when the arm switching devices are supplied with the gate drive signals UH, UL, VH, VL, WH, WL, currents do not flow through the arm switching devices unless the corresponding parallel diodes 83*u*, 83*v*, 83*w*, 84*u*, 84*v*, 84*w* are turned off.

As shown in FIGS. 5 and 6, in either of the voltage reducing mode and the voltage increasing mode of the DC/DC converter 36, as can be understood from the waveforms of the gate drive signals UH, UL, VH, VL, WH, WL output from the converter controller 54, the U-, V-, W-phase arms UA, VA, WA are alternately turned on by the gate drive signals UH, UL, VH, VL, WH, WL in the rotation switching process per one switching period 2π. When the U-, V-, W-phase arms UA, VA, WA are turned on, the upper arm switching devices 81*u*, 81*v*, 81*w* of the U-, V-, W-phase arms UA, VA, WA are turned on by the gate drive signals UH, VH, WH (see FIG. 5), or the lower arm switching devices 82*u*, 82*v*, 82*w* of the U-, V-, W-phase arms UA, VA, WA are turned on by the gate drive signals UL, VL, WL (see FIG. 6).

Figure 7:
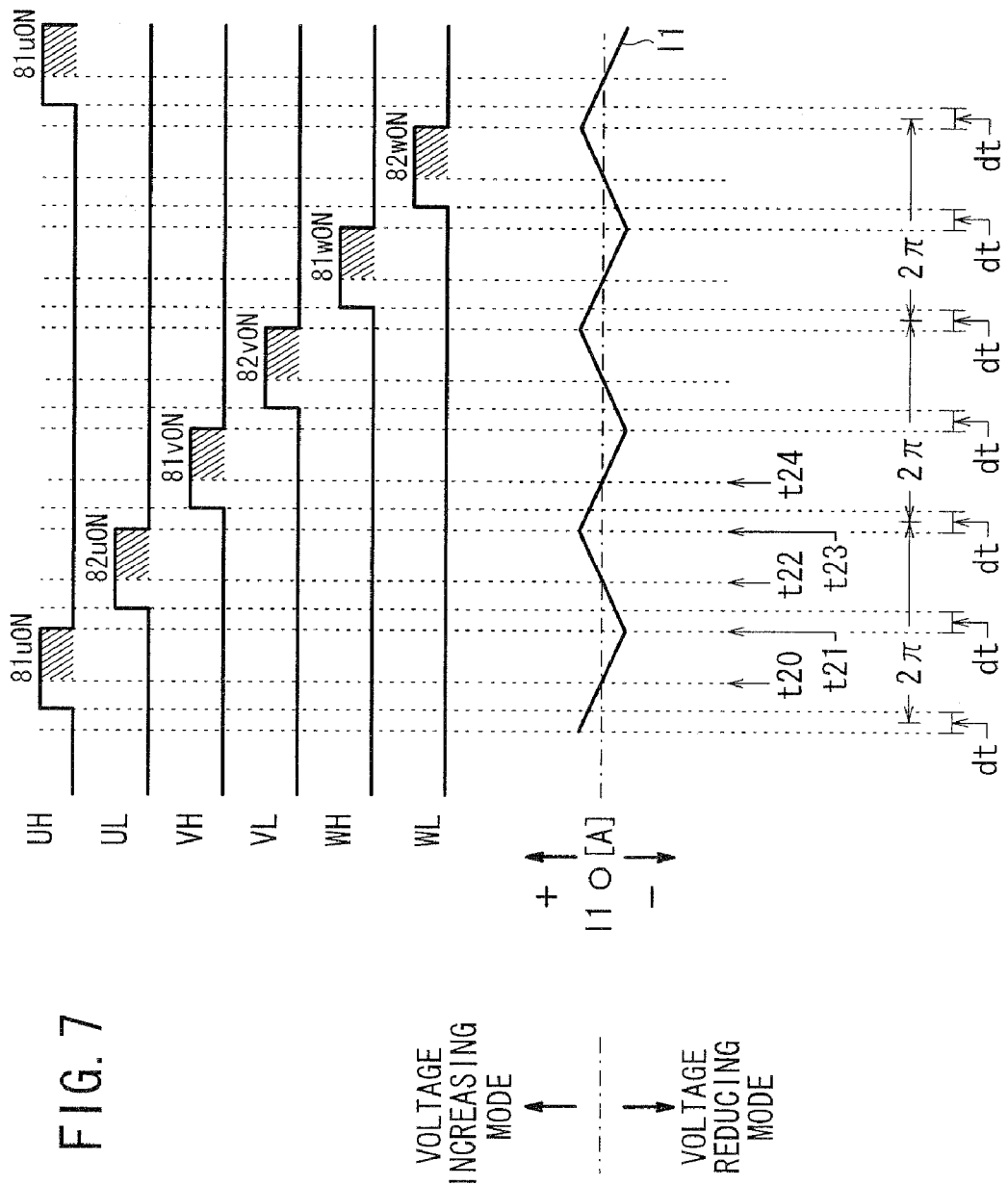
FIG. 7 is a timing chart showing transitions between the voltage increasing mode and the voltage reducing mode of the DC/DC converter apparatus.

As shown in FIGS. 5, 6, and 7, in order to prevent the upper and lower arm switching devices 81, 82 from being turned on simultaneously and hence to prevent the secondary voltage V2 from being short-circuited, dead times dt are inserted between the gate drive signals UH, UL, the gate drive signals VH, VL, and the gate drive signals WH, WL for alternately turning on the upper arm switching devices 81*u*, 81*v*, 81*w* or the lower arm switching devices 82*u*, 82*v*, 82*w*. When the U-, V-, W-phase arms UA, VA, WA are turned on, dead times dt are inserted between the gate drive signals UL, VH, the gate drive signals VL, WH, and the gate drive signals WL, UH. In other words, so-called synchronous switching is performed with the dead times dt inserted between the ON times.

In the voltage reducing mode shown in FIG. 5, while the upper arm switching device 81*u* is being turned on by the gate drive signal UH in a period between time t1 and time t2, energy is stored in the reactor 90 through the upper arm switching device 81*u* by the secondary current I2 from the fuel cell 22 and/or the regenerative power supply. In a period from time t2 to time t5 which includes a dead time d5, an ON time of the gate drive signal UL (with no current flowing through the lower arm switching device 82*u*), and another dead time dt, the energy stored in the reactor 90 is discharged as the primary current I1 to the primary end 1S through the diodes 84*u*, 84*v*, 84*w* that function as flywheel diodes and are rendered conductive. From time t5, the upper arm switching devices 81*v*, 81*w*, 81*u*, . . . are successively turned on repeatedly.

In the voltage increasing mode shown in FIG. 6, while the lower arm switching device 82*u* is being turned on by the gate drive signal UL in a period between time t13 and time t14, energy is stored in the reactor 90 by the primary current I1 from the battery 24. In a period from time t14 to time t17 which includes a dead time dt, an ON time of the gate drive signal VH (with no current flowing through the upper arm switching device 81*v*), and another dead time dt, the energy stored in the reactor 90 is discharged to the secondary end 2S through the diodes 83*u*, 83*v*, 83*w* that function as rectifying diodes and are rendered conductive. From time t17, the lower arm switching devices 82*v*, 82*w*, 82*u*, . . . are successively turned on repeatedly.

FIG. 7 shows showing transitions between the voltage increasing mode and the voltage reducing mode. In FIG. 7, in a period (shown hatched) between time t20 and time t21 during which the upper arm switching device 81*u* is turned on by the gate drive signal UH, energy is stored in the reactor 90 through the upper arm switching device 81*u* by the secondary current I2 from the fuel cell 22 and/or the regenerative power supply.

In a period from time t21 to time t22 when the direction of the current is inverted (the sign of the current changes from negative to positive), the energy stored in the reactor 90 is discharged to the primary end 1S through the diodes 84*u*, 84*v*, 84*w* that function as flywheel diodes and are rendered conductive.

In a period between time t22 and time t23 during which the lower arm switching device 82*u* is turned on by the gate drive signal UL, energy is stored in the reactor 90 by the primary current I1 from the battery 24. In a period from time t23 to time t24 at which time the direction of the current is inverted (the sign of the current changes from positive to negative), the energy stored in the reactor 90 is discharged to the secondary end 2S through the diodes 83*u*, 83*v*, 83*w* rendered conductive. The same operation as describe above will subsequently be repeated. In the three-phase rotation switching process according to the present embodiment, as described above, smooth switching is made between the voltage increasing mode and the voltage reducing mode.

According to the embodiment described above, the VCU 23 has the DC/DC converter 36 comprising the three phase arms, i.e., the parallel-connected phase arms UA, VA, WA, having the upper arm switching devices 81 and the lower arm switching devices 82, connected between the secondary end 2S as the junction between the fuel cell 22 and the inverter 34 and the primary end 1S connected to the battery 24, and the converter controller 54 for controlling the DC/DC converter 36.

When the converter controller 54 turns on the three phase arms UA, VA, WA of the DC/DC converter 36, the converter controller 54 alternately turns on the three U-, V-, W-phase arms UA, VA, WA, i.e., turns on the upper arm switching device 81*u* of the U-phase arm UA (see FIGS. 5 through 7), thereafter turns on the lower arm switching device 82*u* of the U-phase arm UA (see FIG. 7), thereafter turns on the upper arm switching device 81*v* of the V-phase arm VA (see FIGS. 5 through 7), and thereafter turns on the lower arm switching device 82*v* of the V-phase arm VA (see FIG. 7). In this manner, the converter controller 54 rotates the switching timings.

Figure 8:
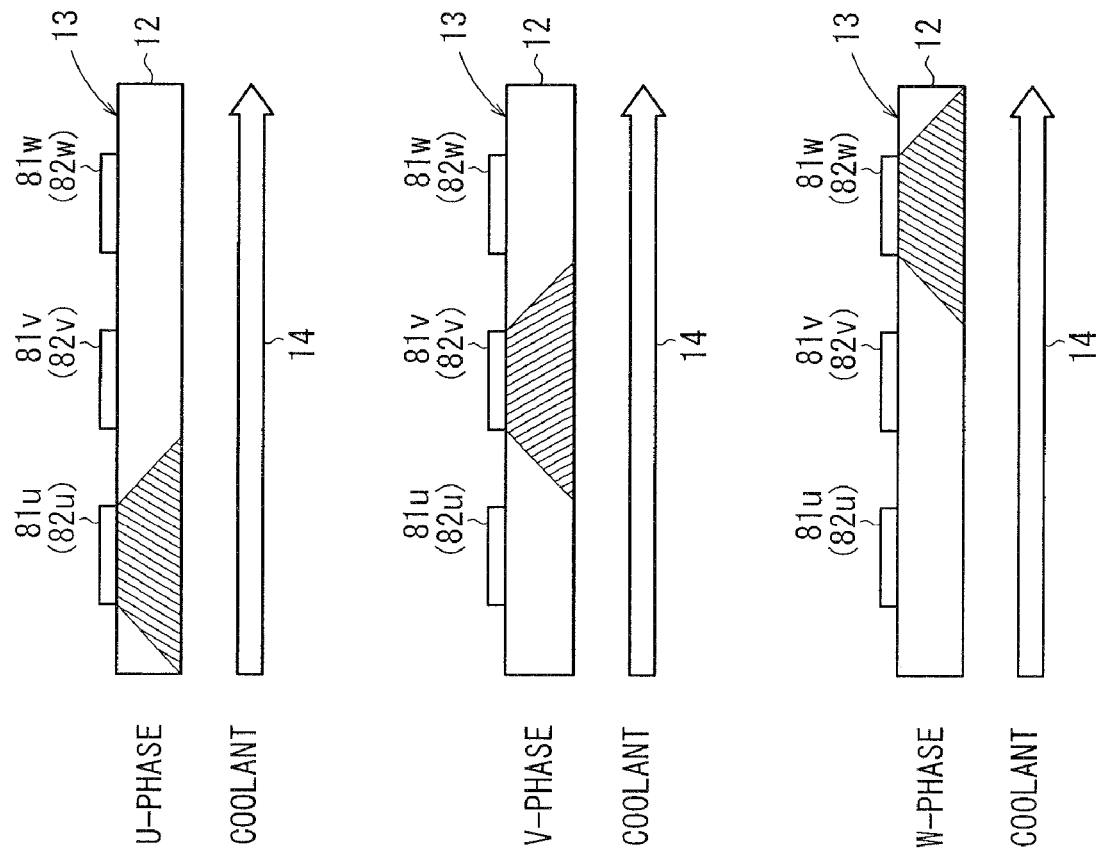
FIG. 8 is a side elevational view showing how heat is radiated when three-phase arms are turned on in a rotation switching process, e.g., a U-phase arm is turned on, then a V-phase arm is turned on, a W-phase arm is turned on, thereafter the U-phase arm is turned on, . . .

FIG. 8 shows the manner in which the heat from the arm switching devices 81*u*, 81*v*, 81*w*, 82*u*, 82*v*, 82*w* is radiated when the three phase arms are switched in rotation, i.e., the U-phase arm is turned on, then the V-phase arm is turned on, thereafter the W-phase arm is turned on, then the U-phase arm is turned on, . . . .

As shown in FIG. 8, according to the rotation switching process, only one upper arm switching device 81 or one lower arm switching device 82 is turned on at a time. Consequently, as can be understood from heat radiating paths shown hatched in FIG. 8, the heat radiating paths are not superposed simultaneously unlike the superposed regions shown cross-hatched in FIG. 18B. The DC/DC converter 36 thus has an increased heat radiating capability, and hence the 6-in-1 module 13 is reduced in size and weight.

The DC/DC converter 36 shown in FIG. 1 includes the three phase arms UA, VA, WA of series-connected circuits of the upper and lower arm switching devices 81*u*, 81*v*, 81*w*, 82*u*, 82*v*, 82*w* and the diodes 83*u*, 83*v*, 83*w*, 84*u*, 84*v*, 84*w* that are connected inversely across the respective arm switching devices 81*u*, 81*v*, 81*w*, 82*u*, 82*v*, 82*w*, the three phase arms UA, VA, WA being connected parallel to each other between the battery 24 as the first power device and the fuel cell 22 and/or the inverter 34 and the motor 26 as the second power device and the single reactor 90 inserted between the commonly connected midpoints of the three phase arms UA, VA, WA and the battery 24 (or the second power device) as the first power device.

This arrangement allows the single reactor 90 to be used in the DC/DC converter 36 for increasing and reducing the voltage with the three phase arms.

Specifically, the converter controller 54 for controlling the DC/DC converter 36 alternately turns on the three phase arms UA, VA, WA. When the converter controller 54 turns on the phase arm UA, for example, it outputs the gate drive signals UH, UL for turning on one of the upper arm switching device 81$u$ or the lower arm switching device 82$u$ of the phase arm UA (FIGS. 5 and 6) or alternately turning on the upper arm switching device 81$u$ and the lower arm switching device 82$u$ (FIG. 7). In this manner, the VCU (the DC/DC converter device) 23 is capable of operating in the voltage increasing mode and the voltage reducing mode with the single reactor 90.

The DC/DC converter 36 and the VCU 23 are reduced in size and weight because only one reactor 90 is used in combination therewith.

Figure 16:
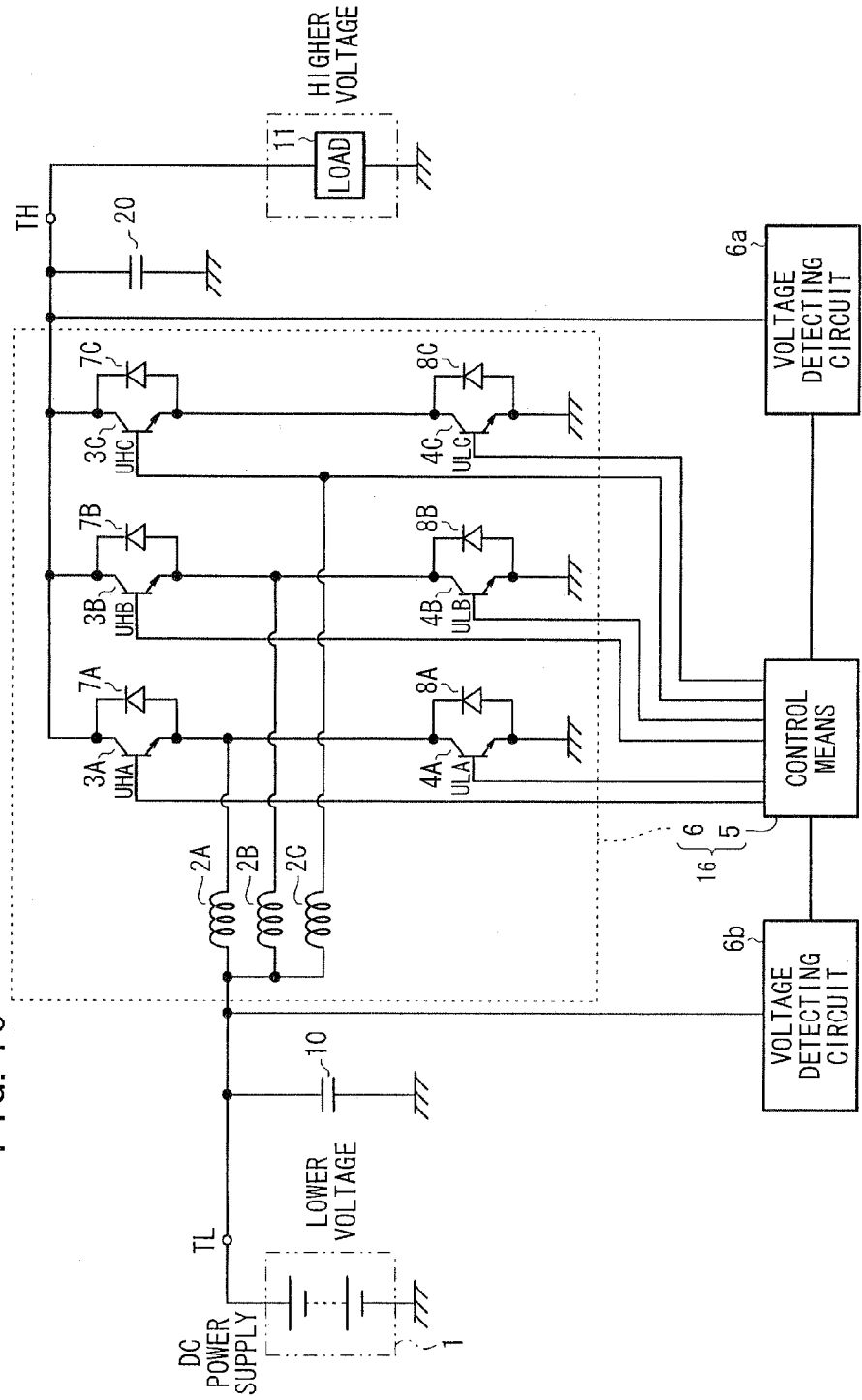
FIG. 16 is a circuit diagram, partly in block form, of a DC/DC converter apparatus having three reactors according to the related art.
Figure 17:
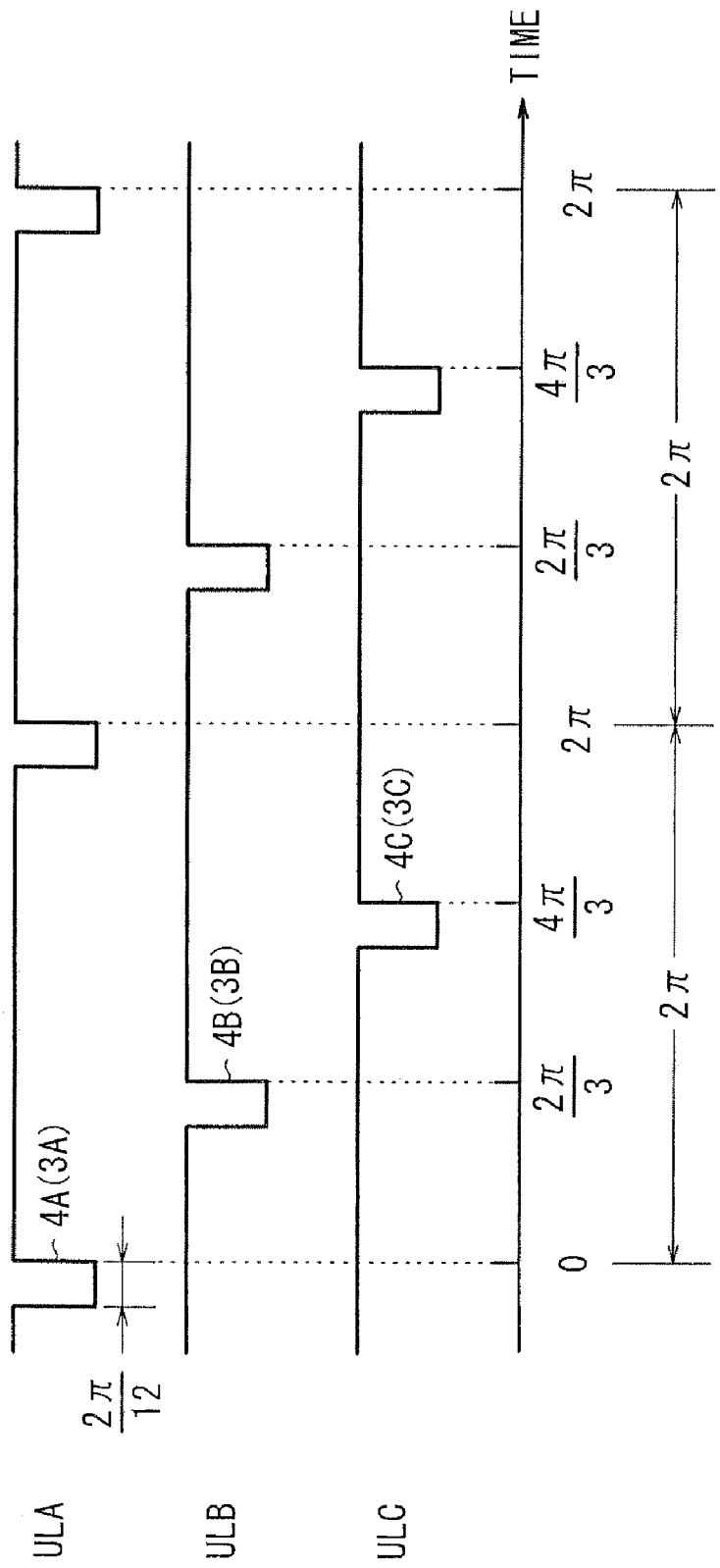
FIG. 17 is a timing chart of an operation sequence of the DC/DC converter apparatus shown in FIG. 16.

With the DC/DC converter 6 having the multiphase arms (three-phase arms for an easier understanding of the invention) according to the related art shown in FIGS. 16 and 17, each of the reactors 2A, 2B, 2C of the three-phase arms is energized once in one switching period $2\pi$. With the DC/DC converter 36 shown in FIG. 1, the single reactor 90 shared by the three-phase arms UA, VA, WA is energized once in one switching period $2\pi$ during the voltage increasing mode (FIG. 6) or the voltage reducing mode (FIG. 5). In principle, therefore, the operating frequency of the reactor 90 of the DC/DC converter 36 shown in FIG. 1 is three times higher than the reactors 2A, 2B, 2C of the DC/DC converter 6 shown in FIGS. 16 and 17.

Since the operating frequency of the reactor 90 is three times higher, the inductance value thereof may be one-third of the inductance values of reactors 2A, 2B, 2C. Accordingly, the reactor 90 may be reduced in size. Inasmuch as the DC/DC converter 36 needs only one reactor 90, the DC/DC converter 36 may be smaller in size and weight than the DC/DC converter having the multiphase arms according to the related art as the number of the phases of the multiphase arms increases.

According to the DC/DC converter 36 shown in FIG. 1, the upper arm switching devices 81 and the lower arm switching devices 82 are not simultaneously turned on, and the different phase arms are not simultaneously turned on. At most one switching device is turned on at all times. Therefore, the DC/DC converter 36 is of an excellent heat radiating capability, i.e., can easily be designed for heat radiation. As a result, the VCU 23 can be reduced in size and weight.

When the converter controller 54 turns on the three U-, V-, W-phase arms UA, VA, WA of the DC/DC converter 36, as described above with reference to FIGS. 5 through 7, it alternately turns on the three U-, V-, W-phase arms UA, VA, WA, i.e., turns on the upper arm switching device 81$u$ of the U-phase arm UA (FIGS. 5 through 7), for example, thereafter turns on the lower arm switching device 82$u$ of the U-phase arm UA (see FIG. 7) after the dead time dt, thereafter turns on the upper arm switching device 81$v$ of the V-phase arm VA (see FIGS. 5 through 7) after the dead time dt, and thereafter turns on the lower arm switching device 82$v$ of the V-phase arm VA (see FIG. 7) after the dead time d5. In this manner, the converter controller 54 rotates the switching timings.

As described above, when the converter controller 54 alternately turns on the upper arm switching devices 81 and the lower arm switching devices 82 of the phase arms UA, VA, WA, it alternately turns them on with the dead time dt interposed therebetween, and alternately turns on the phase arms UA, VA, WA with the dead time dt interposed therebetween. In this manner, the upper arm switching devices 81$u$, 81$v$, 81$w$ and the lower arm switching devices 82$u$, 82$v$, 82$w$ are prevented from being short-circuited and hence the phase arms are prevented from being short-circuited.

Figure 9:
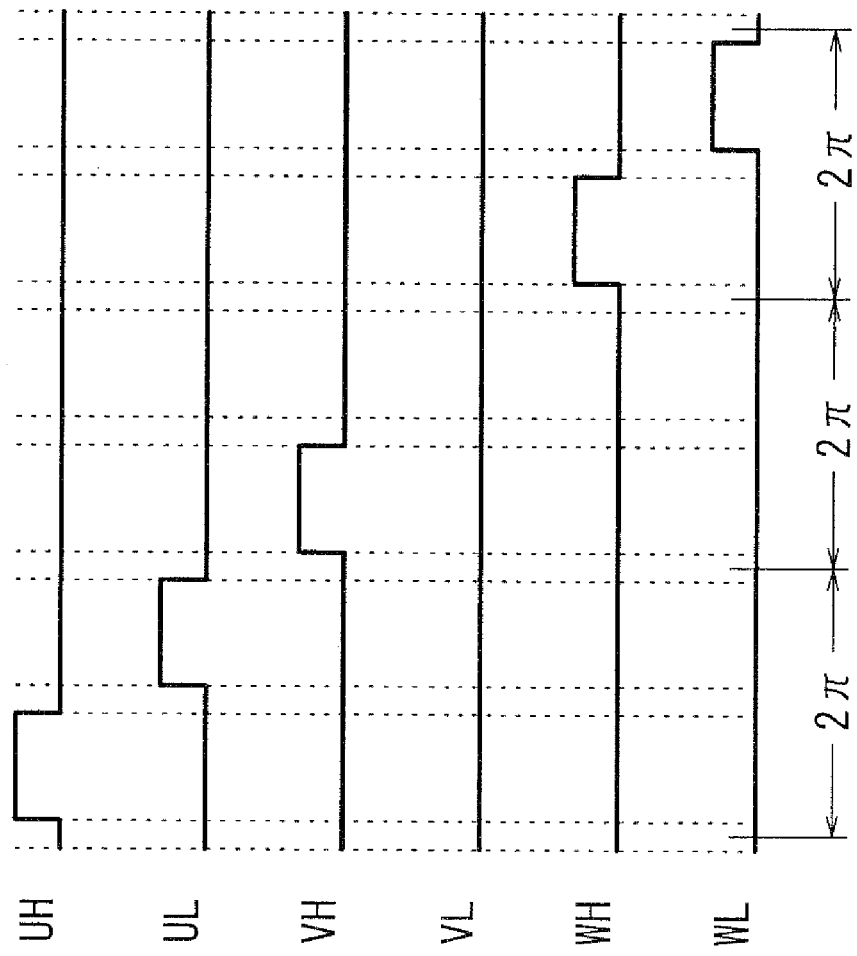
FIG. 9 is a timing chart of gate drive signals UH, UL, VH, VL, WH, WL in a three-phase rotation switching process according to another embodiment.

FIG. 9 is a timing chart of gate drive signals UH, UL, VH, VL, WH, WL in a rotation switching process according to another embodiment.

In the rotation switching process according to the other embodiment shown in FIG. 9, not all the gate drive signals UH, UL, VH, VL, WH, WL are rotated, but the gate drive signal VL is inactivated. As shown in FIG. 4A, the arm switching devices 81$u$, 81$v$, 81$w$, 82$u$, 82$v$, 82$w$ are associated with the respective temperature sensors 69. The lower arm switching device 82$v$, for example, whose temperature as detected by the associated temperature sensor 69 is higher than a threshold temperature is temporarily disabled, and the rotation switching process is continued with the other arm switching devices 81$u$, 81$v$, 81$w$, 82$u$, 82$w$. When the temperature of the lower arm switching device 82$v$ becomes lower than the threshold temperature and returns to a normal range, the rotation switching process involving all the gate drive signals UH, UL, VH, VL, WH, WL is resumed. A gate drive signal to be inactivated is not limited to one arm. Three gate drive signals UH, VH, VL, for example, may be inactivated.

The intermittent rotation switching process shown in FIG. 9 is applicable to a case where when a certain phase arm suffers a fault such as an open circuit, the faulty phase arm is not operated, but the other phase arms only are operated to continue the switching process. The intermittent rotation switching process makes the VCU 23 and hence the fuel cell vehicle 20 more reliable.

According to the present invention, as described above, when the converter controller 54 alternately turns on the three phase arms UA, VA, WA, the converter controller 54 alternately turns on either one of the upper arm switching devices 81 (81$u$, 81$v$, 81$w$) or either one of the lower arm switching devices 82 (82$u$, 82$v$, 82$w$) of the phase arms UA, VA, WA.

When the converter controller 54 alternately turns on the three phase arms UA, VA, WA, the converter controller 54 may alternately turn on an upper arm switching device and a lower arm switching device of a certain phase at random, and thereafter may alternately turn on a next upper arm switching device and a next lower arm switching device of a next phase at random. Alternatively, when the converter controller 54 alternately turns on the three phase arms UA, VA, WA, the converter controller 54 may alternately turn on them one in every $2\pi$-switching period for easy control, or may alternately turn on them one in two switching periods $4\pi$ or more.

Figure 10:
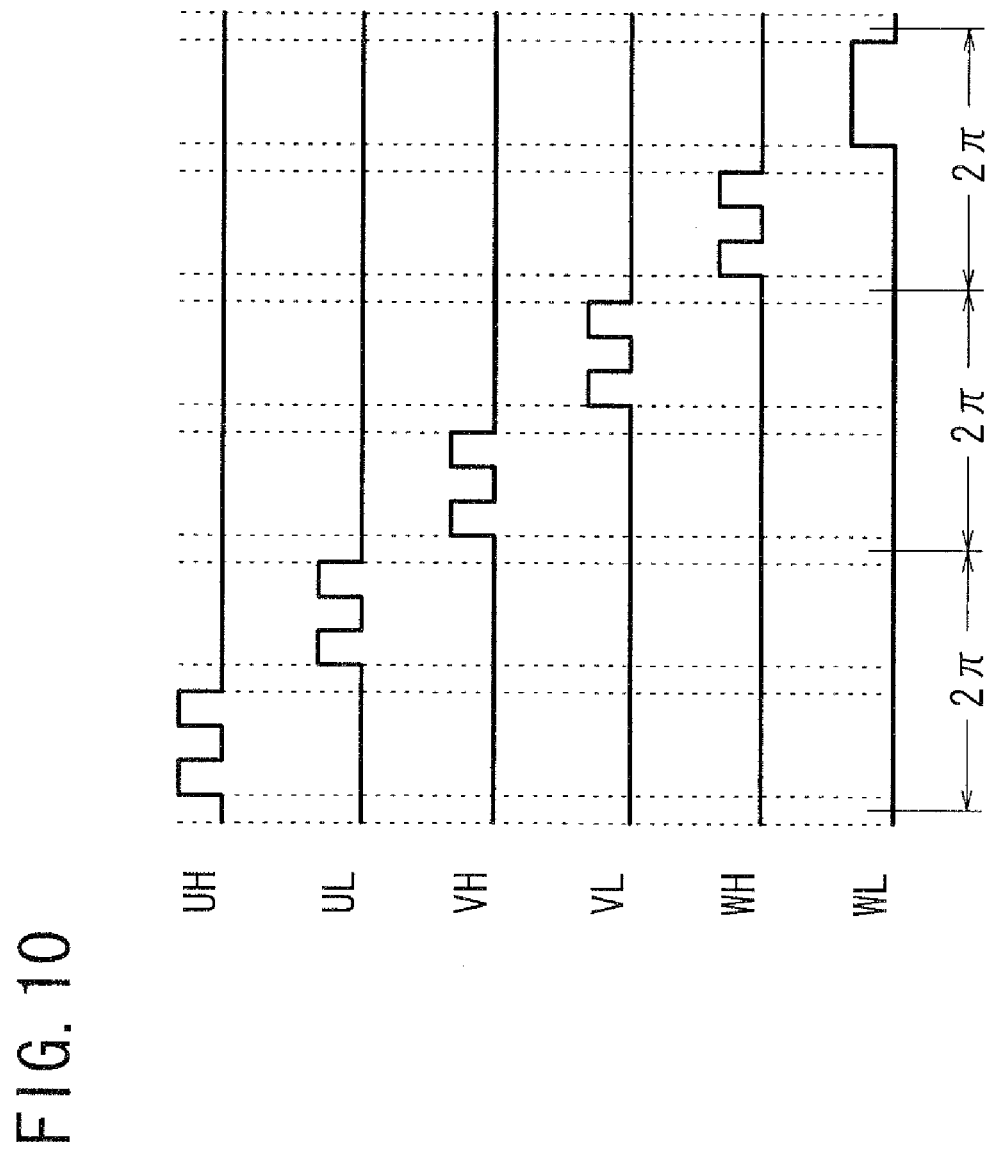
FIG. 10 is a timing chart of gate drive signals UH, UL, VH, VL, WH, WL in a modified three-phase rotation switching process.

FIG. 10 shows a modified rotation switching process in which the converter controller 54 turns on the upper arm switching devices 81 (81$u$, 81$v$, 81$w$) and/or the lower arm switching devices 82 (82$u$, 82$v$, 82$w$) a plurality of times in one switching period $2\pi$.

According to the embodiment described above, the upper arm switching devices 81 and the lower arm switching devices 82 are not simultaneously turned on, and the different phase arms UA, VA, WA are not simultaneously turned on. Rather, at most one switching device is turned on at all times. Therefore, the DC/DC converter 36 is of an excellent heat radiating capability.

Figure 11:
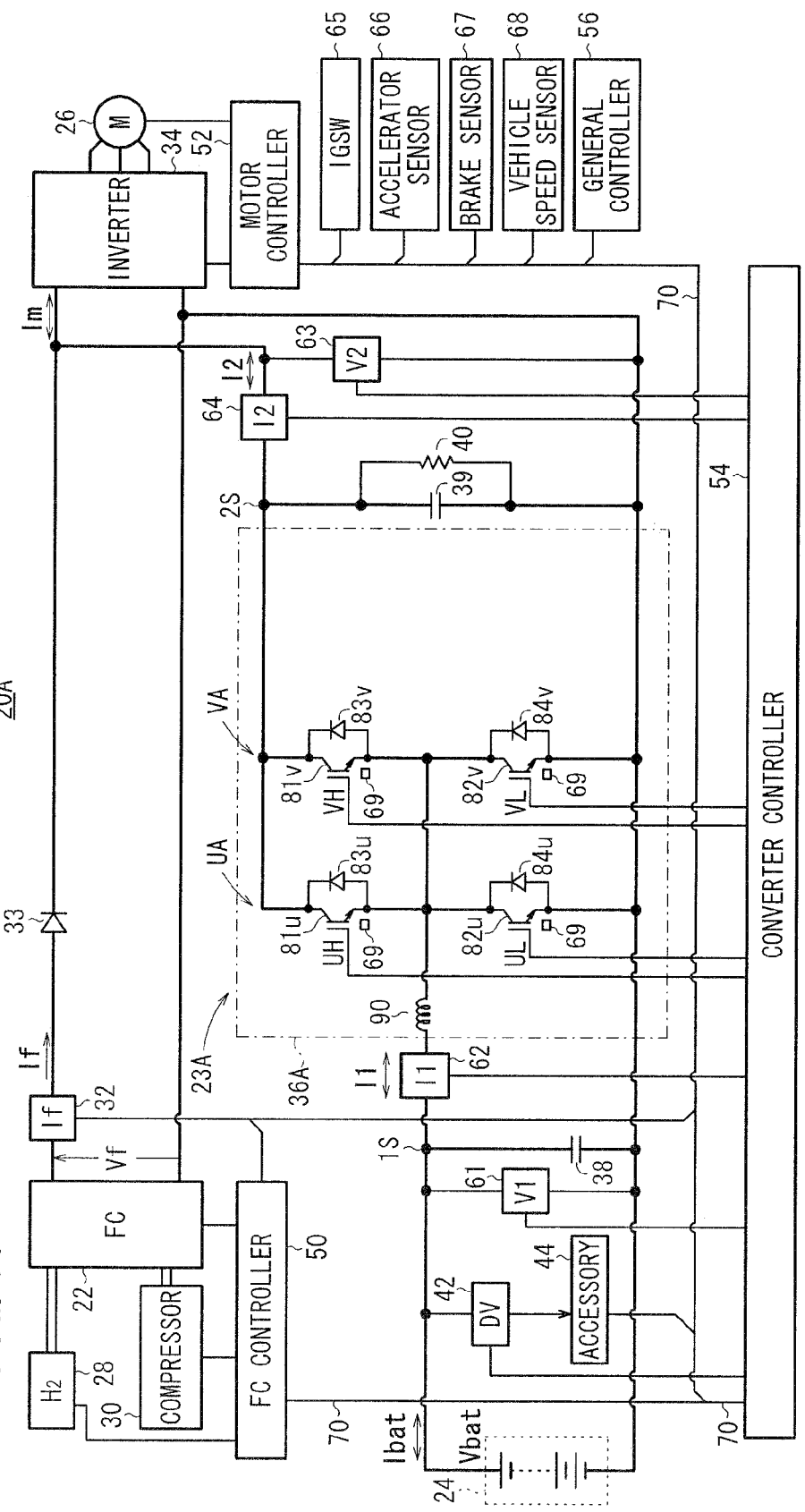
FIG. 11 is a circuit diagram, partly in block form, of a fuel cell vehicle incorporating a two-phase DC/DC converter apparatus.

As shown in FIG. 11, the principles of the present invention are also applicable to a fuel cell vehicle 20A incorporating a two-phase DC/DC converter 36A, rather than the three-phase DC/DC converter 36. The present invention is thus applicable to a DC/DC converter having two or more phases, e.g., four or more phases.

Figure 12:
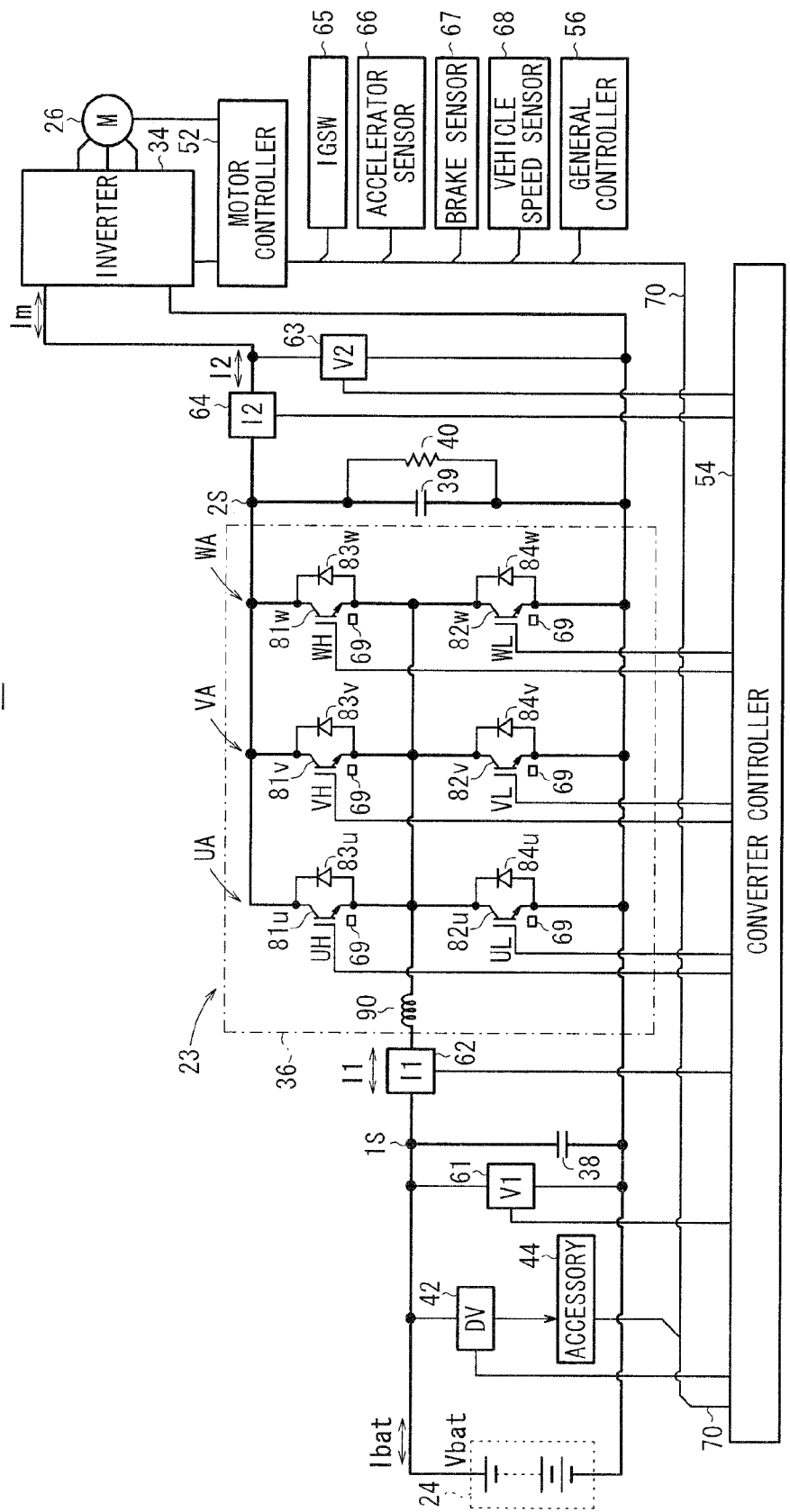
FIG. 12 is a circuit diagram, partly in block form, of a battery-powered vehicle.

The principles of the present invention are also applicable to a battery-driven vehicle (electric vehicle) 21 shown in FIG. 12, in addition to the fuel cell vehicles 20, 20A. The principles of the present invention are further applicable to a parallel or series parallel hybrid vehicle which incorporates an engine, a battery, and a motor.

The motor 26 is not limited to those for use on vehicles, but may be motors for use with elevators or the like.

Figure 13:
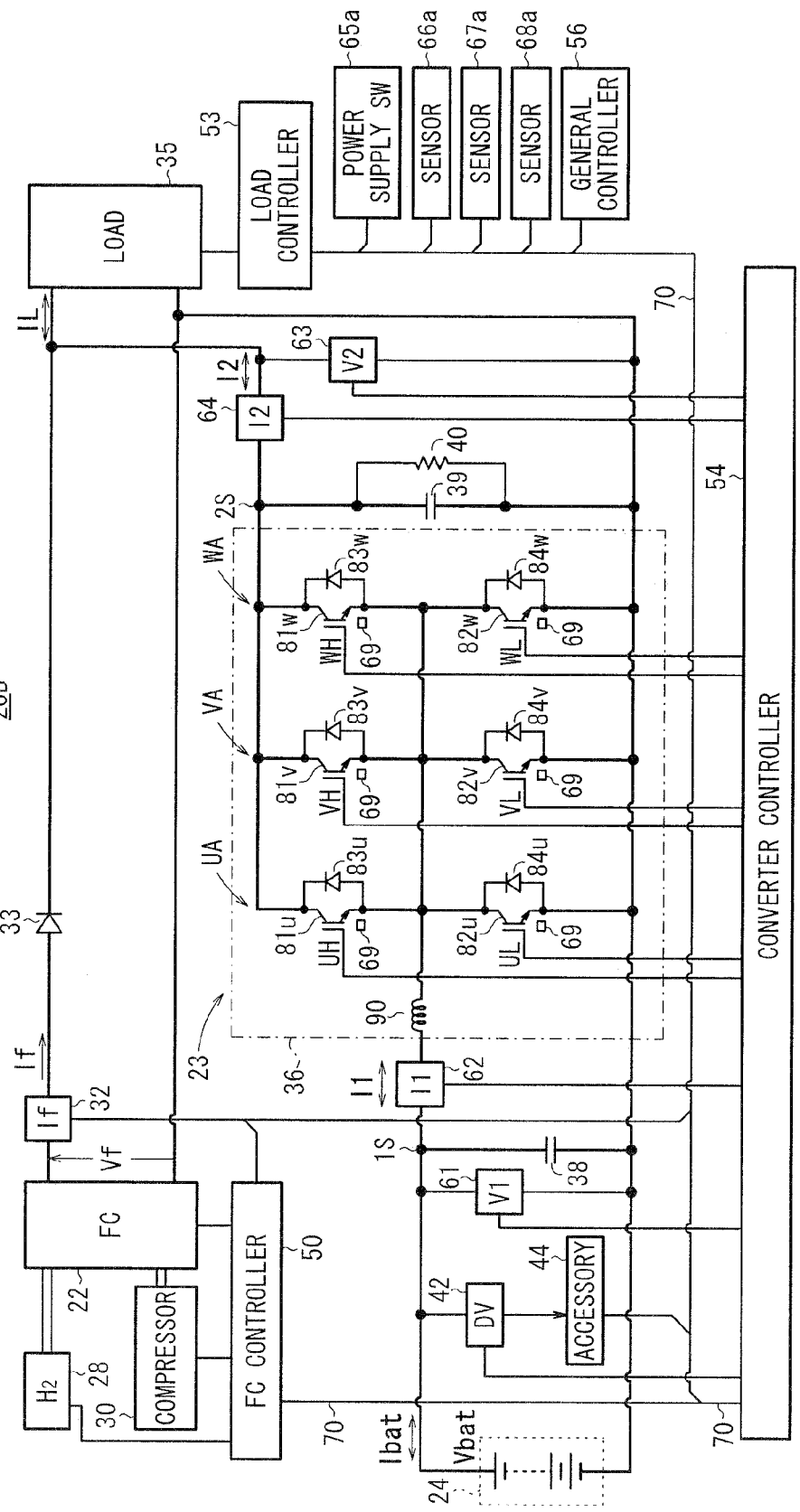
FIG. 13 is a circuit diagram, partly in block form, of a fuel cell system.

As shown in FIG. 13, the principles of the present invention are also applicable to a fuel cell system 20B which employs a single-phase load 35 instead of the inverter 34, a load controller 53 instead of the motor controller 52, a power supply switch 65a instead of the ignition switch 65, and various sensors 66a, 67a, 68a instead of the sensors 66, 67, 68. The general controller 56 controls the VCU 23 through the converter controller 54 for thereby controlling a load current IL.

Figure 14:
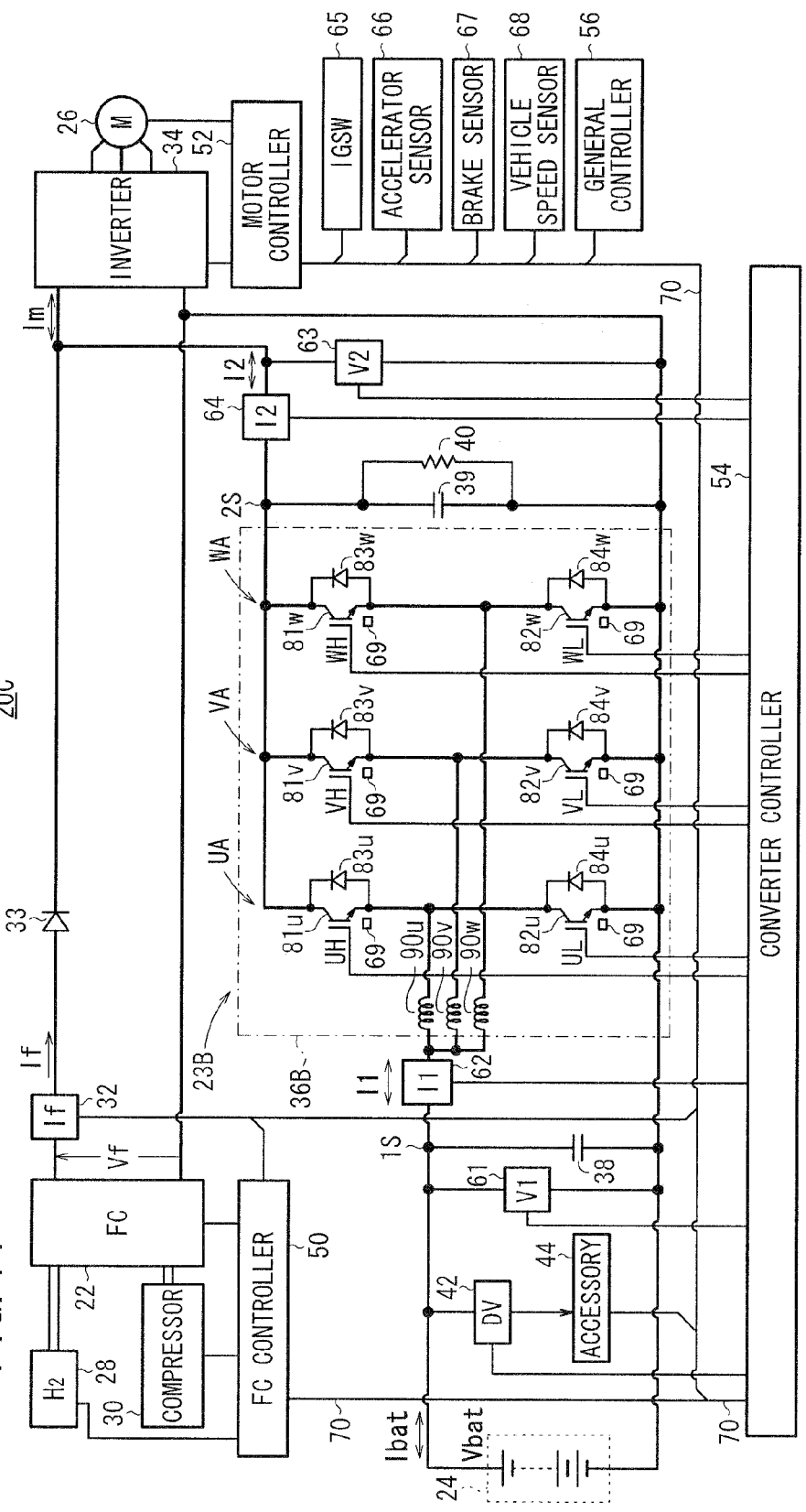
FIG. 14 is a circuit diagram, partly in block form, of a fuel cell vehicle incorporating a DC/DC converter apparatus having three reactors.

As shown in FIG. 14, the principles of the present invention are also applicable to a fuel cell vehicle 20C incorporating a DC/DC converter 36B which includes three reactors 90u, 90v, 90w connected to the respective midpoints of the U-, V-, W-phase arms UA, VA, WA. For example, when the converter controller 54 is to turn on the multiphase arms of the DC/DC converter 36B, it alternately turns on the phase arms UA, VA, WA, and when the converter controller 54 is to turn on the phase arms UA, VA, WA, it alternately turns on either one of the upper arm switching devices 81u, 81v, 81w or either one of the lower arm switching devices 82u, 82v, 82w of the phase arms UA, VA, WA. Therefore, the upper arm switching devices 81u, 81v, 81w and the lower arm switching devices 82u, 82v, 82w are not simultaneously turned on, and the different phase arms UA, VA, WA are not simultaneously turned on. Rather, at most one switching device is turned on at all times. Therefore, the DC/DC converter 36B is of an excellent heat radiating capability, i.e., can easily be designed for heat radiation. As a result, the DC/DC converter apparatus 23B can be reduced in size and weight.

Figure 15:
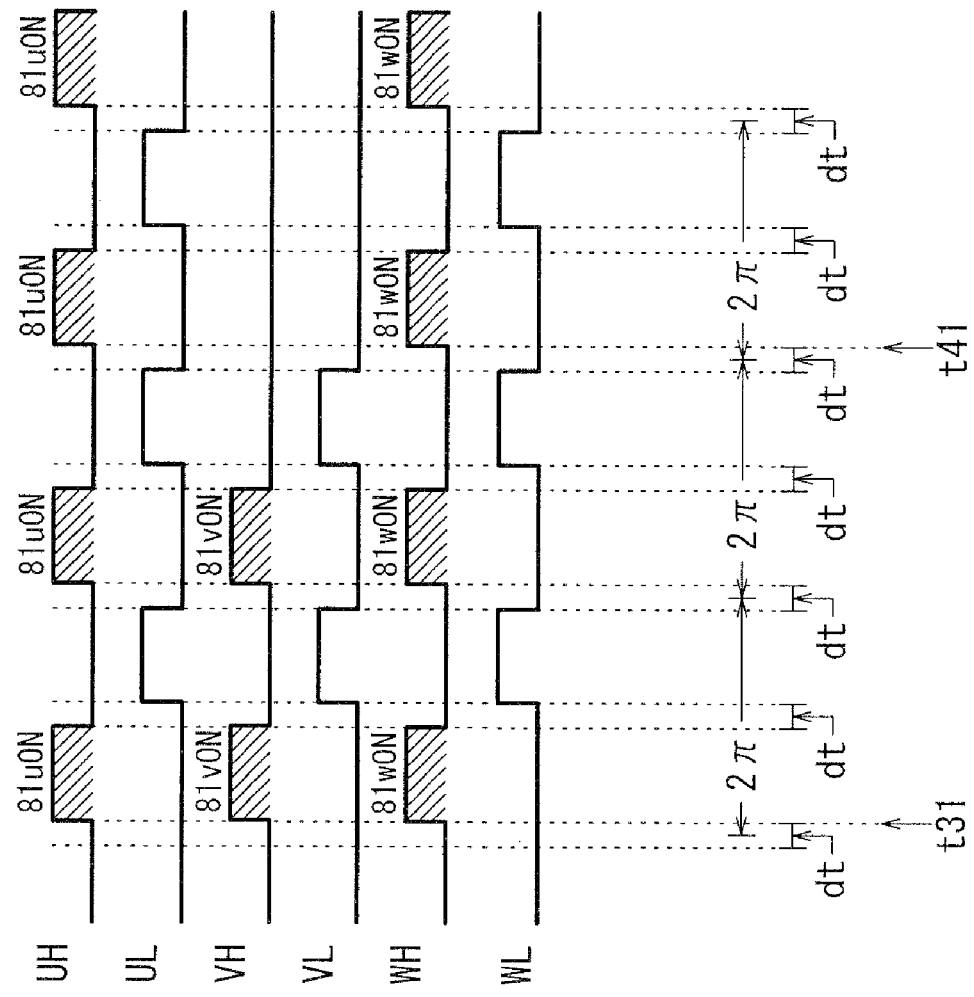
FIG. 15 is a timing chart of a voltage reducing mode of a DC/DC converter apparatus according to still another embodiment.

The present invention is not limited to the above embodiments, but may be modified in various ways. For example, FIG. 15 is a timing chart of a voltage reducing mode of a DC/DC converter apparatus, which corresponds to FIG. 5, according to still another embodiment. As shown in FIG. 15, insofar as the switching devices are used in a range of their rated currents (allowable device temperatures), the upper arm switching devices 81u, 81v, 81w of the three phases are simultaneously turned on by the gate drive signals UH, UV, UW from time t31 and then, after a dead time dt, the upper arm switching devices 81u, 81v, 81w of the three phases are simultaneously turned on by the gate drive signals UH, UV, UW. From time t41, two of the three phases are simultaneously turned on and then, after a dead time dt, two of the three phases are simultaneously turned on. In the voltage increasing mode shown in FIG. 6 and the alternate voltage increasing and reducing modes shown in FIG. 7, the switching devices may also be simultaneously turned on with dead times dt interposed.

Although certain preferred embodiments of the present invention have been shown and described in detail, it should be understood that various changes and modifications may be made therein without departing from the scope of the appended claims.

What is claimed is:

1. A method of driving a DC/DC converter capable of operating in a voltage increasing mode and a voltage reducing mode, the method comprising the steps of:
   connecting a plurality of phase arms parallel to each other between a first electric power device and a second electric power device, each of the phase arms comprising a series-connected circuit of an upper arm switching device and a lower arm switching device and diodes connected inversely across the upper arm switching device and lower arm switching device;
   alternately turning on the phase arms; and
   when one of the phase arms is turned on, turning on either the upper arm switching device in one switching period in the voltage reducing mode, or the lower arm switching device in one switching period in the voltage increasing mode, the switching period being 2π, or alternately turning on the upper arm switching device and the lower arm switching device once in one switching period in a transition between the voltage reducing mode and the voltage increasing mode, the switching period being 2π.

2. A method according to claim 1, wherein when the phase arms are alternately turned on, the upper arm switching device and the lower arm switching device of one of the phase arms are alternately turned on, and thereafter the upper arm switching device and the lower arm switching device of a next one of the phase arms are alternately turned on.

3. A method according to claim 1, wherein when the phase arms are alternately turned on, the upper arm switching device of one of the phase arms is turned on, thereafter the lower arm switching device of the one of the phase arms is turned on, thereafter the upper arm switching device of a next one of the phase arms is turned on, and thereafter the lower arm switching device of the next one of the phase arms is turned on.

4. A method according to claim 1, wherein when the phase arms are alternately turned on, the phase arms are alternately turned on one in every switching period.

5. A method according to claim 1, wherein when the upper arm switching device and the lower arm switching device of one of the phase arms are alternately turned on, the upper arm switching device and the lower arm switching device are alternately turned on with a dead time interposed therebetween, and the phase arms are alternately turned on with a dead time interposed therebetween.

6. A method according to claim 1, further comprising the step of measuring temperatures of the upper arm switching devices and the lower arm switching devices; and
   when the phase arms are turned on, disabling those of the upper arm switching devices or the lower arm switching devices whose measured temperatures are higher than a threshold value.

7. A method according to claim 1, further comprising the step of inserting a single reactor between the first electric power device or the second electric power device and respective midpoints which connect the phase arms to each other, wherein the single reactor discharges and stores energy when the DC/DC converter converts a voltage between the first electric power device and the second electric power device.

8. A method according to claim 1, wherein the phase arms comprise three phase arms, and the six upper and lower arm switching devices of the three phase arms are fixedly mounted on a single heat radiation plate.

9. A DC/DC converter capable of operating in a voltage increasing mode and a voltage reducing mode comprising:

a first electric power device;

a second electric power device;

a plurality of phase arms connected parallel to each other between the first electric power device and the second electric power device, each of the phase arms comprising a series-connected circuit of an upper arm switching device and a lower arm switching device and diodes connected inversely across the upper arm switching device and the lower arm switching device, the phase arms having respective midpoints connected to each other;

a reactor inserted between the connected midpoints and the first electric power device or the second electric power device; and a controller programmed to control the phase arms to turn on one at a time every switching period, the controller outputting a drive signal for turning on either the upper arm switching device in one switching period in the voltage reducing mode, or the lower arm switching device in the voltage increasing mode in one switching period, the switching period being $2\pi$, or alternately turning on the upper arm switching device and the lower arm switching device in a transition between the voltage reducing mode and the voltage increasing mode once in one switching period, the switching period being $2\pi$.

* * * * *